United States Patent
Yeo et al.

(10) Patent No.: US 11,637,454 B2
(45) Date of Patent: Apr. 25, 2023

(54) ELECTRONIC DEVICE FOR RECEIVING POWER WIRELESSLY AND METHOD FOR OPERATING SAME

(71) Applicants: SAMSUNG ELECTRONICS CO., LTD., Suwon-si (KR); RESEARCH & BUSINESS FOUNDATION SUNGKYUNKWAN UNIVERSITY, Suwon-si (KR)

(72) Inventors: Sungku Yeo, Suwon-si (KR); Kangyoon Lee, Suwon-si (KR); Chongmin Lee, Suwon-si (KR); Dongin Kim, Suwon-si (KR); Sangyun Kim, Suwon-si (KR); Jaeseok Park, Suwon-si (KR); Youngho Ryu, Suwon-si (KR); Hamed Abbasizadeh, Suwon-si (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 17/272,822

(22) PCT Filed: Sep. 3, 2019

(86) PCT No.: PCT/KR2019/011322
§ 371 (c)(1),
(2) Date: Mar. 2, 2021

(87) PCT Pub. No.: WO2020/050587
PCT Pub. Date: Mar. 12, 2020

(65) Prior Publication Data
US 2021/0194291 A1    Jun. 24, 2021

(30) Foreign Application Priority Data
Sep. 3, 2018 (KR) .................. 10-2018-0104480

(51) Int. Cl.
*H02J 50/12* (2016.01)
*H02J 50/20* (2016.01)
(Continued)

(52) U.S. Cl.
CPC .............. *H02J 50/20* (2016.02); *H02J 50/12* (2016.02); *H02M 7/23* (2013.01); *H02M 7/25* (2013.01)

(58) Field of Classification Search
USPC ........................................................ 307/104
See application file for complete search history.

(56) References Cited

U.S. PATENT DOCUMENTS

2009/0016090 A1    1/2009   Knight
2009/0160526 A1*  6/2009   Mohammadi .......... G06G 7/161
                                                                      327/360
(Continued)

FOREIGN PATENT DOCUMENTS

JP       H04344580       * 12/1992
KR    10-2009-0007234        1/2009
(Continued)

OTHER PUBLICATIONS

International Search Report for PCT/KR2019/011322, dated Dec. 13, 2019, 6 pages.
(Continued)

*Primary Examiner* — Rexford N Barnie
*Assistant Examiner* — Xuan Ly
(74) *Attorney, Agent, or Firm* — Nixon & Vanderhye, P.C.

(57) ABSTRACT

An electronic device according to various embodiments of the present invention comprises: a receiving circuit for outputting an AC power received wirelessly; and a rectifier circuit for rectifying the AC power being output from the power receiving circuit. The rectifier circuit comprises a forward rectifier circuit and a reverse rectifier circuit. A first terminal of the forward rectifier circuit is connected to the receiving circuit and the reverse rectifier circuit, a second terminal of the forward rectifier circuit is connected to an output terminal, and the forward rectifier circuit comprises
(Continued)

first transistors for rectifying the AC power during a first period. A first terminal of the reverse rectifier circuit is connected to the receiving circuit and the forward rectifier circuit, a second terminal of the reverse rectifier circuit is connected to a ground, and the reverse rectifier circuit can comprise second transistors for preventing the AC power from being transmitted to the forward rectifier circuit during a second period.

7 Claims, 12 Drawing Sheets

(51) Int. Cl.
  *H02M 7/23* (2006.01)
  *H02M 7/25* (2006.01)

(56) References Cited

U.S. PATENT DOCUMENTS

| | | | | |
|---|---|---|---|---|
| 2011/0234157 | A1* | 9/2011 | Knight | H02M 3/33592 320/108 |
| 2013/0314951 | A1 | 11/2013 | Harrison | |
| 2014/0035383 | A1 | 2/2014 | Riehl | |
| 2015/0280450 | A1 | 10/2015 | Park et al. | |
| 2016/0043562 | A1 | 2/2016 | Lisi et al. | |
| 2018/0212469 | A1* | 7/2018 | Liu | H04B 5/0037 |
| 2019/0269913 | A1* | 9/2019 | Pivonka | A61N 1/3614 |

FOREIGN PATENT DOCUMENTS

| | | |
|---|---|---|
| KR | 10-2014-0129918 | 11/2014 |
| KR | 10-2015-0112160 | 10/2015 |
| KR | 10-2016-0115534 | 10/2016 |
| KR | 10-2016-0144775 | 12/2016 |
| WO | 2015/077726 | 5/2015 |
| WO | 2015/139053 | 9/2015 |

OTHER PUBLICATIONS

Written Opinion of the ISA for PCT/KR2019/011322, dated Dec. 13, 2019, 4 pages.
Office Action dated Mar. 1, 2023 in counterpart Korean Patent Application No. KR10-2018-0104480 and English-language translation.

* cited by examiner

ELECTRONIC DEVICE FOR RECEIVING POWER WIRELESSLY AND METHOD FOR OPERATING SAME

CROSS-REFERENCE TO RELATED APPLICATION(S)

This application is a National Phase Entry of PCT International Application No. PCT/KR2019/011322, which was filed on Sep. 3, 2019 and claims priority to Korean Patent Application No. 10-2018-0104480, which was filed on Sep. 3, 2018 in the Korean Intellectual Property Office, the contents of which are incorporated herein by reference.

BACKGROUND

1. Field

Various embodiments of the present disclosure relate to an electronic device for wirelessly receiving a power and an operating method thereof.

2. Description of the Related Art

For many people in modern times, portable digital communication devices have become essential items. Consumers want to be provided with various high quality services they want regardless of time or place. In addition, due to the recent development of Internet of Things (IoT), various sensors, home appliances, communication devices, etc. existing in our lives are being united via networking. In order to smoothly operate these various sensors, a wireless power transmission system is required.

Wireless power transmission schemes includes a magnetic induction scheme, a magnetic resonance scheme, and an electromagnetic wave scheme. The magnetic induction scheme or the magnetic resonance scheme is advantageous for charging an electronic device which is located at a relatively short distance from a wireless power transmission device. The electromagnetic wave scheme is advantageous for remote power transmission up to several meters compared with the magnetic induction scheme or the magnetic resonance scheme. The electromagnetic wave scheme is mainly used for remote power transmission, and may identify an exact location of a remote power receiver and transmit power most efficiently.

SUMMARY

For example, an electromagnetic wave scheme includes a scheme of transmitting a power wirelessly using a radio frequency (RF) signal. If the power is wirelessly transmitted using the RF signal, long-distance power transmission of up to several meters may be possible between a wireless power transmission device and a wireless power reception device, however a difference in an amount of a transmitted power may be large according to a distance. For example, if a distance between the wireless power transmission device and the wireless power reception device is long, an amount of a transmitted power may be small, and if the distance between the wireless power transmission device and the wireless power reception device is short, an amount of a transmitted power may be large.

The wireless power reception device may receive a power of an alternating current waveform using an RF signal transmitted from the wireless power transmission device and rectify a received RF power via a rectification circuit. As the distance between the wireless power transmission device and the wireless power reception device is long or short, an amount of a power inputted to the rectification circuit may be small or large. If a power outside a designated-input power range is inputted to the rectification circuit, stable rectification may be impossible. For example, if a power outside the input power range is inputted to the rectification circuit, components included in the rectification circuit may be damaged or may malfunction.

For example, the rectification circuit included in the wireless power reception device may include a transistor, and if a power larger than the designated-input power range is inputted to the rectification circuit and a voltage larger than an operating voltage of the transistor is applied, the transistor may be damaged or may malfunction.

According to various embodiments, an electronic device including a rectification circuit whose input power range is wide and which may perform stable rectification even if a large power is inputted, and an operating method thereof may be provided.

An electronic device according to various embodiments may include a reception circuit configured to wirelessly receive an alternating current power, and a rectification circuit configured to rectify the alternating current power received via the reception circuit, wherein the rectification circuit may include a forward rectification circuit and a reverse rectification circuit, wherein a first terminal of the forward rectification circuit may be connected to the reception circuit and the reverse rectification circuit, a second terminal of the forward rectification circuit may be connected to an output terminal, and the forward rectification circuit may include first transistors configured to rectify the alternating current power during a first period, and wherein a first terminal of the reverse rectification circuit may be connected to the reception circuit and the forward rectification circuit, a second terminal of the reverse rectification circuit may be connected to a ground, and the reverse rectification circuit may include second transistors configured to prevent the alternating current power from being transferred to the forward rectification circuit.

An electronic device according to various embodiments may include a first reception circuit configured to receive a first alternating current power via an electromagnetic wave, a second reception circuit configured to receive a second alternating current power via resonance, a first rectification circuit configured to rectify the first alternating current power received via the first reception circuit, a second rectification circuit configured to rectify the second alternating current power received via the second reception circuit, and a switch circuit configured to output a power whose magnitude is larger among the first direct current power rectified by the first rectification circuit and the second direct current power rectified by the second rectification circuit, wherein the first rectification circuit may include a forward rectification circuit and a reverse rectification circuit, wherein a first terminal of the forward rectification circuit may be connected to the first reception circuit and the reverse rectification circuit, a second terminal of the forward rectification circuit may be connected to the switch circuit, and the forward rectification circuit may include first transistors configured to rectify the first alternating current power during a first period, and wherein a first terminal of the reverse rectification circuit may be connected to the first reception circuit and the forward rectification circuit, a second terminal of the reverse rectification circuit may be connected to a ground, and the reverse rectification circuit may include second transistors configured to prevent the first alternating current power from being transferred to the forward rectification circuit.

An operating method of an electronic device including a rectification circuit according to various embodiments may include receiving an alternating current power which is obtained using an RF wave formed around an antenna, rectifying the received alternating current power to obtain a direct current power, if a magnitude of a voltage of the direct current power is larger than or equal to a designated voltage, decreasing the voltage of the direct current power to the designated voltage, if the magnitude of the voltage of the direct current power is smaller than the designated voltage, increasing the voltage of the direct current power to the designated voltage, and providing a power of the designated voltage.

According to various embodiments, an electronic device including a rectification circuit whose input power range is wide and which may perform stable rectification even if a large power is inputted, and an operating method thereof may be provided.

According to various embodiments, an input power is distributed to each of a plurality of transistors if the input power is large by providing a rectification circuit using the plurality of transistors, so it may be prevented that each of the transistors included in the rectification circuit is damaged or malfunction even though the large power is inputted to the rectification circuit.

DETAILED DESCRIPTION

Figure 1:
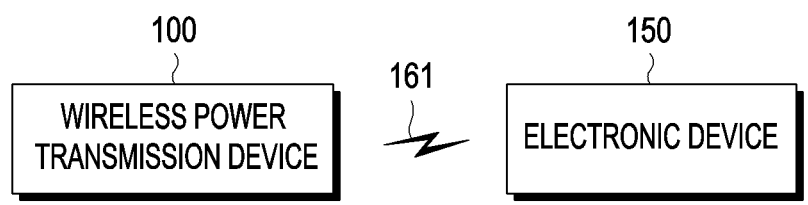
FIG. 1 is a block diagram illustrating a wireless power transmission device and an electronic device according to various embodiments.

Hereinafter, various embodiments in the present document will be described with reference to the accompanying drawings. The embodiments and the terms used therein are not intended to limit a technology disclosed in the present document to specific forms, and should be understood to include various modifications, equivalents, and/or alternatives to the corresponding embodiments. In describing the drawings, similar reference numerals may be used to designate similar components. A singular expression may include a plural expression unless they are definitely different in a context. In the present document, the expression "A or B" or "at least one of A and/or B" may include all possible combinations of items enumerated together. The expression "a first", "a second", "the first", or "the second" may modify various components regardless of the order and/or the importance, and is used merely to distinguish one component from another component without limiting the corresponding components. When a component (e.g., a first component) is referred to as being "(functionally or communicatively) connected," or "directly coupled" to another component (a second component), the component may be connected directly to the other component or connected to the other component through yet another component (e.g., a third component).

The expression "configured to" as used in the present document may be interchangeably used with, for example, "suitable for", "having the capacity to", "adapted to", "made to", "capable of", or "designed to" in terms of hardware or software, according to situations. Alternatively, in some situations, the expression "device configured to" may mean that the device, together with other devices or components, "is able to". For example, the phrase "processor adapted (or configured) to perform A, B, and C" may mean a dedicated processor (e.g., an embedded processor) for performing corresponding operations or a generic-purpose processor (e.g., a CPU or an application processor) that may perform corresponding operations by executing one or more software programs stored in a memory device.

A wireless power transmission device or an electronic device according to various embodiments of the present document may include at least one of, for example, a smart phone, a tablet PC, a mobile phone, a video phone, an electronic book reader, a desktop PC, a laptop PC, a netbook computer, a workstation, a server, a PDA, a portable multimedia player (PMP), an MP3 player, a medical device, a camera, and a wearable device. The wearable device may include at least one of an accessory type (e.g., a watch, a ring, a bracelet, an ankle bracelet, a necklace, a glasses, a contact lens, or a head-mounted device (HMD)), a fabric or clothing integrated type (e.g., an electronic clothing), a body-mounted type (e.g., a skin pad, or tattoo), or a bio-implantable circuit. In some embodiments, the wireless power transmission device or the electronic device may include at least one of, for example, a television, a set top box which is interworked wiredly or wirelessly with the television, a digital video disk (DVD) player, an audio, a refrigerator, an air conditioner, a cleaner, an oven, a microwave oven, a washing machine, an air purifier, a set top box, a home automation control panel, a security control panel, a media box, a game console, an electronic dictionary, an electronic key, a camcorder, an electric car, or an electronic picture frame.

In another embodiment, the wireless power transmission device or the electronic device may include at least one of various medical devices (e.g., various portable medical measuring devices (a blood glucose monitoring device, a heart rate monitoring device, a blood pressure measuring device, or a body temperature measuring device, etc.), a magnetic resonance angiography (MRA), a magnetic resonance imaging (MRI), a computed tomography (CT) machine, or an ultrasonic machine, and/or the like), a navigation device, a global positioning system (global navigation satellite system (GNSS)), an event data recorder (EDR), a flight data recorder (FDR), a vehicle infotainment device, an electronic device for a ship (e.g., a navigation device for a ship, and a gyro-compass, etc.), avionics, a security device, an automotive head unit, a robot for home or industry, a drone, an automatic teller's machine (ATM) in banks, point of sales (POS) in a shop, or internet device of things (e.g., a light bulb, various sensors, a sprinkler device, a fire alarm, a thermostat, a streetlamp, a toaster, sporting goods, a hot water tank, a heater, a boiler, etc.). According to an arbitrary embodiment, the wireless power transmitting device or the electronic device may include at least one of a part of furniture, a building/structure, or a car, an electronic board, an electronic signature receiving device, a projector, and various measuring devices (e.g., a water meter, an electric meter, a gas meter, or a radio wave meter, etc.). In various embodiments, the wireless power transmission device or the electronic device may be flexible, or may be a combination of two or more of various devices described above. The wireless power transmission device or the electronic device according to an embodiment in the present document is not limited to the above described devices. Herein, the term "user" may refer to a person who uses the electronic device or a device (e.g., an artificial intelligence electronic device) that uses the wireless power transmission device or the electronic device.

FIG. 1 is a block diagram illustrating a wireless power transmission device and an electronic device according to various embodiments.

Referring to FIG. 1, a wireless power transmission device 100 according to various embodiments may wirelessly transmit a power 161 to an electronic device 150. The wireless power transmission device 100 may transmit the power 161 to the electronic device 150 according to various charging schemes. For example, the wireless power transmission device 100 may transmit the power 161 according to an induction scheme. If the wireless power transmission device 100 is based on the induction scheme, the wireless power transmission device 100 may include, for example, a power source, a direct current-alternating current conversion circuit, an amplifying circuit, an impedance matching circuit, at least one capacitor, at least one coil, a communication modulation/de-modulation circuit, and/or the like. The at least one capacitor may also constitute a resonance circuit together with the at least one coil. The wireless power transmission device 100 may be implemented in a manner defined in a wireless power consortium (WPC) standard (or Qi standard). For example, the wireless power transmission device 100 may transmit the power 161 according to a resonance scheme. In a case of the resonance scheme, the wireless power transmission device 100 may include, for example, a power source, a direct current-alternating current conversion circuit, an amplifying circuit, an impedance matching circuit, at least one capacitor, at least one coil, an out-band communication circuit (e.g., a Bluetooth low energy (BLE) communication circuit), and/or the like. The least one capacitor and the at least one coil may constitute a resonance circuit. The wireless power transmission device 100 may be implemented in a manner defined in Alliance for Wireless Power (A4WP) standard (or air fuel alliance (AFA) standard). The wireless power transmission device 100 may include a coil capable of generating an induced magnetic field when a current flows according to the resonance scheme or the induction scheme. A process of generating the induced magnetic field in the wireless power transmission device 100 may be expressed as that the wireless power transmission device 100 wirelessly transmits the power 161. In addition, the electronic device 150 may include a coil in which an induced electromotive force is generated by a magnetic field whose strength changes according to time and which is formed around the electronic device 150. A process of generating the induced electromotive force via the coil in the electronic device 150 may be expressed as that the electronic device 150 wirelessly receives the power 161. For example, the wireless power transmission device 100 may transmit the power 161 according to an electromagnetic wave scheme. If the wireless power transmission device 100 is based on the electromagnetic wave scheme, the wireless power transmission device 100 may include, for example, a power source, a direct current-alternating current conversion circuit, an amplifying circuit, a distribution circuit, a phase shifter, an antenna array for power transmission including a plurality of patch antennas, a communication circuit (e.g., a BLE communication module) of an out-band scheme, and/or the like. Each of the plurality of patch antennas may form a radio frequency (RF) wave (e.g., an electromagnetic wave). The electronic device 150 may include a patch antenna capable of outputting a current using an RF wave formed around the electronic device 150. A process of forming the RF wave in the wireless power transmission device 100 may be expressed as that the wireless power transmission device 100 wirelessly transmits the power 161. A process of outputting the current from the patch antenna using the RF wave in the electronic device 150 may be expressed as that the electronic device 150 wirelessly receives the power 161.

The wireless power transmission device 100 according to various embodiments may communicate with the electronic device 150. For example, the wireless power transmission device 100 may communicate with the electronic device 150 according to an in-band scheme. The wireless power transmission device 100 or the electronic device 150 may modulate data to be transmitted according to, for example, an on/off keying modulation scheme and change a load (or impedance) based on the data modulation. The wireless power transmission device 100 or the electronic device 150 may identify data transmitted from a counterpart device by measuring a load change (or impedance change) based on a change in a magnitude of a current, a voltage, or a power of a coil. For example, the wireless power transmission device 100 may communicate with the electronic device 150 according to an out-band scheme. The wireless power transmission device 100 or the electronic device 150 may transmit and receive data using a communication circuit (e.g., a BLE communication module) provided separately from a coil or a patch antenna.

In this document, a fact that the wireless power transmission device 100 or the electronic device 150, or another electronic device performs a specific operation may mean a fact that various hardware, for example, a control circuit such as a processor, a coil, a patch antenna, and/or the like included in the wireless power transmission device 100 or the electronic device 150, or the other electronic device. Alternatively, the fact that the wireless power transmission device 100 or the electronic device 150, or the other electronic device performs the specific operation may mean a fact that the processor controls other hardware to perform the specific operation. Alternatively, the fact that the wireless power transmission device 100 or the electronic device 150, or the other electronic device performs the specific operation may mean a fact that an instruction for performing the specific operation which is stored in a storage circuit (e.g., a memory) of the wireless power transmission device 100 or the electronic device 150, or the other electronic device is executed, so the instruction causes the processor or the other hardware to perform the specific operation.

Figure 2:
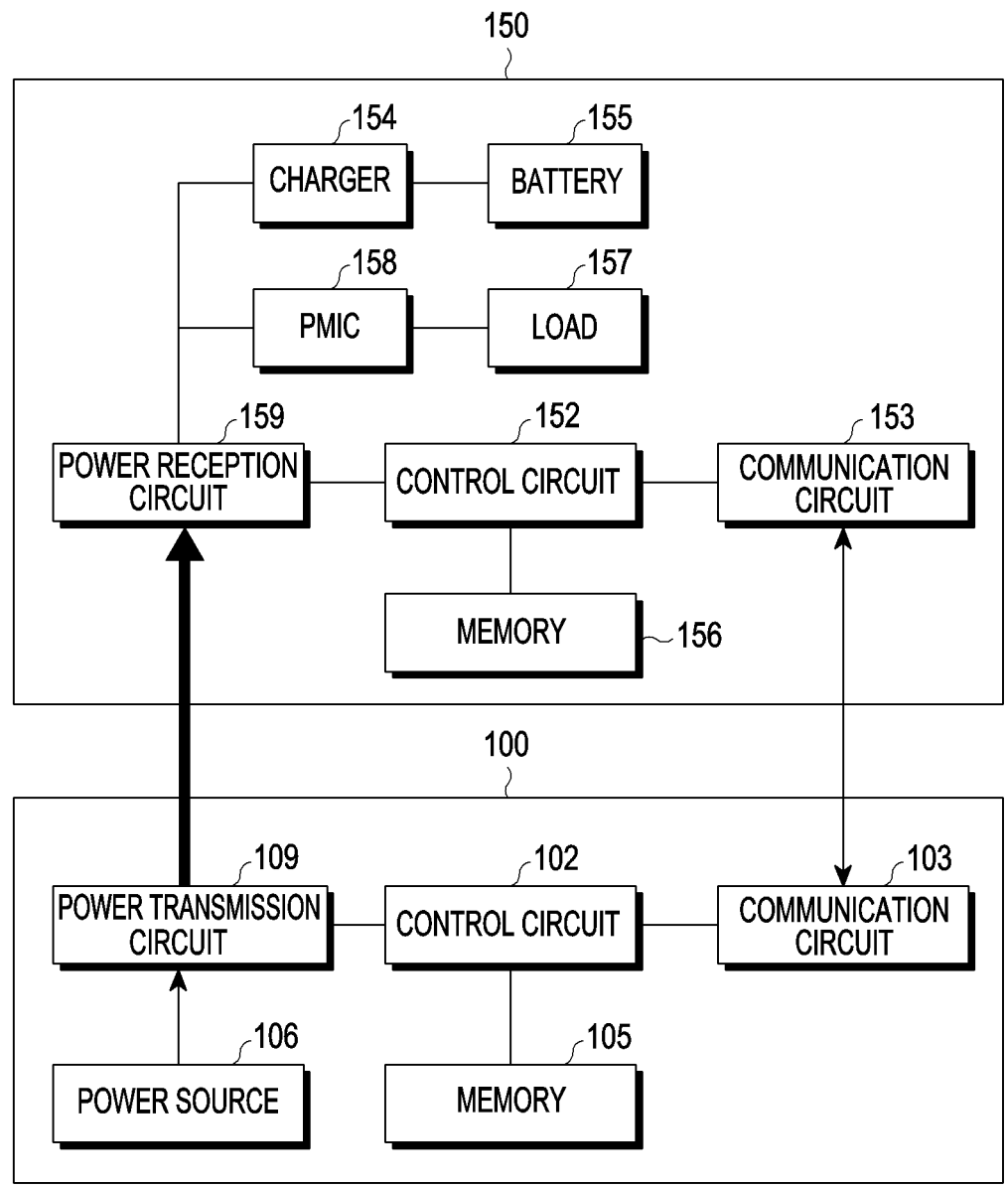
FIG. 2 is a block diagram illustrating a wireless power transmission device and an electronic device according to various embodiments.

FIG. 2 is a block diagram illustrating a wireless power transmission device and an electronic device according to various embodiments.

A wireless power transmission device 100 according to various embodiments may include a power transmission circuit 109, a control circuit 102, a communication circuit 103, a memory 105, and a power source 106. An electronic device 150 according to various embodiments of the present disclosure may include a power reception circuit 159, a control circuit 152, a communication circuit 153, a memory 156, a charger 154, a battery 155, and a power management integrated circuit (PMIC) 158 and a load 157.

The power transmission circuit 109 according to various embodiments may wirelessly transmit a power to the power reception circuit 159 according to at least one of an induction scheme, a resonance scheme, or an electromagnetic wave scheme. Detailed configurations of the power transmission circuit 109 and the power reception circuit 159 will be described in more detail with reference to FIGS. 3A and 3B. The control circuit 102 may control a magnitude of a power transmitted by the power transmission circuit 109. For example, the control circuit 102 may control a magnitude of a power outputted from the power source 106, or may control a magnitude of a power transmitted by the power transmission circuit 109 by controlling an amplification gain of a power amplifier included in the power transmission circuit 109. The control circuit 102 may adjust a magnitude of a power outputted from the power source 106 by controlling a duty cycle or a frequency of the power outputted from the power source 106. The power source 106 may include, for example, a power interface connectable to a wall power source, and may receive an alternating current power having a voltage set for each country from the wall power source and transmit the alternating current power to the power transmission circuit 109.

The control circuit 102 may control a magnitude of a power applied to the power transmission circuit 109 by controlling a magnitude of a bias voltage of a power amplifier. The control circuit 102 or the control circuit 152 may be implemented as various circuits of capable of performing operations such as a general-purpose processor such as a CPU, a mini computer, a microprocessor, a micro controlling unit (MCU), a field programmable gate array (FPGA), and/or the like, and there is no limitation to a kind thereof.

The power reception circuit 159 according to various embodiments may wirelessly receive a power from the power transmission circuit 109 according to at least one of an induction scheme, a resonance scheme, or an electromagnetic wave scheme. The power reception circuit 159 may perform power processing of rectifying a received power of an alternating current waveform into a direct current waveform, converting a voltage, or regulating a power. The charger 154 may charge the battery 155 of the electronic device 150. The charger 154 may charge the battery 155 in a constant voltage (CV) mode, a constant current (CC) mode, and/or the like, but there is no limitation to the charging mode. The PMIC 158 may adjust a power to a voltage or a current suitable for the connected load 157 to provide the adjusted power to the load 157. The control circuit 152 may control the overall operation of the electronic device 150. The memory 156 may store an instruction for performing the overall operation of the electronic device 150. The memory 105 may store an instruction for performing an operation of the wireless power transmission device 100. The memory 105 or the memory 156 may be implemented in various forms such as a read only memory (ROM), a random access memory (RAM), a flash memory, and/or the like, and there is no limitation to the form of implementation.

Figure 3A:
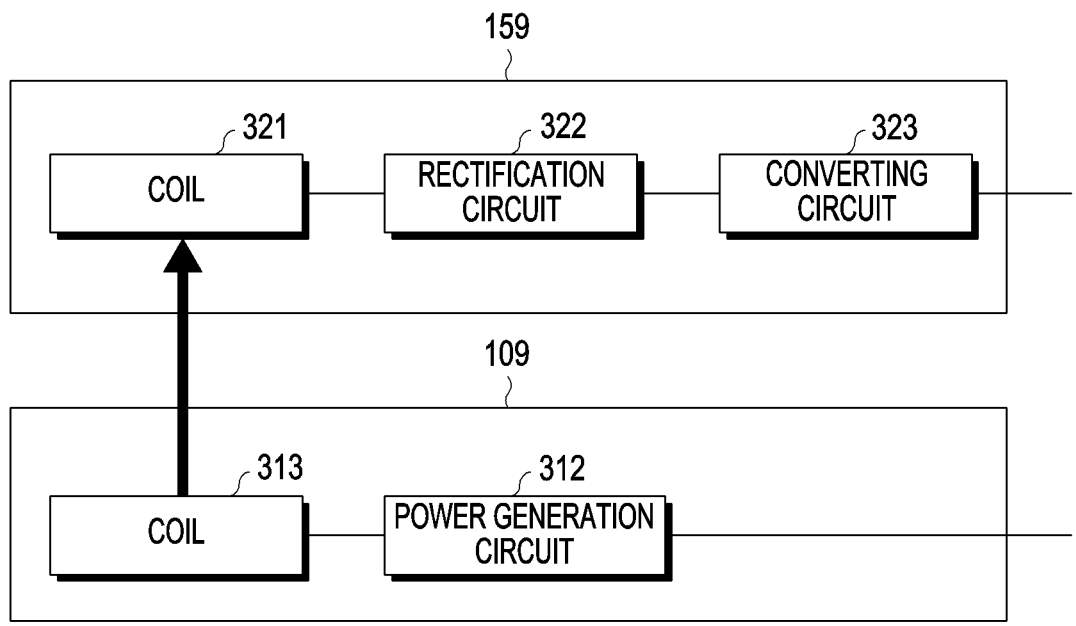
FIG. 3A is a block diagram illustrating a power transmission circuit and a power reception circuit according to an induction scheme or a resonance scheme according to various embodiments.

FIG. 3A is a block diagram illustrating a power transmission circuit and a power reception circuit according to an induction scheme or a resonance scheme according to various embodiments.

According to various embodiments, a power transmission circuit 109 may include a power generation circuit 312 and a coil 313. The power generation circuit 312 may first rectify an alternating current power received from the outside, and invert the rectified power to provide a coil with the inverted power. A maximum voltage or a voltage of 0 may be alternately applied to the coil 313 at a preset period by an inverting operation, and accordingly, a magnetic field may be generated from the coil 313. An inverting frequency, i.e., a frequency of an alternating current waveform applied to the coil 313 may be set to 100 to 205 kHz, 6.78 MHz, and/or the like according to a standard, but there is no limitation. If a power is applied to the coil 313, an induced magnetic field whose strength changes over time may be formed from the coil 313, and accordingly, a power may be transmitted wirelessly. Although not shown, capacitors constituting a resonance circuit together with the coil 313 may be further included in the power transmission circuit 109. An induction electromotive force may be generated in a coil 321 of a power reception circuit 159 by a magnetic field whose strength changes over time and which is formed around the coil 321, and accordingly, the power reception circuit 159 may receive wirelessly a power. A rectification circuit 322 may rectify a received power of an alternating current waveform. A converting circuit 323 may adjust a voltage of the rectified power and transfer the rectified power with the adjusted voltage to hardware. The power reception circuit 159 may further include a regulator, or the converting circuit 323 may be replaced with the regulator.

Figure 3B:
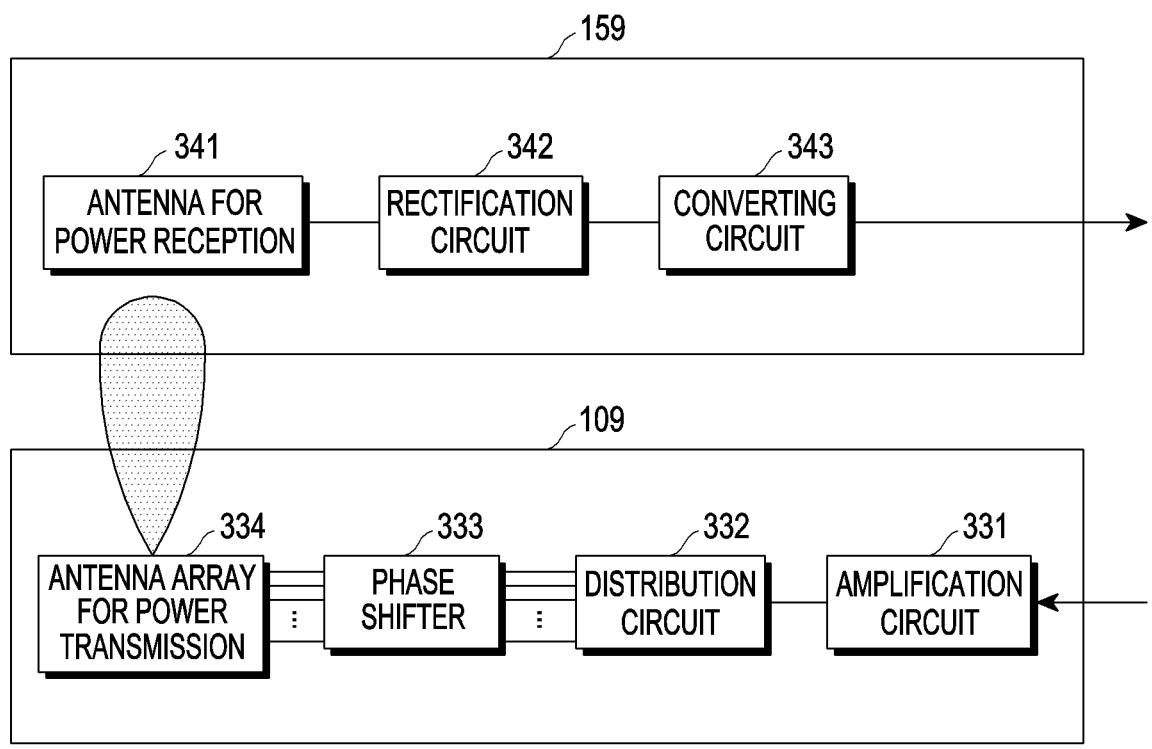
FIG. 3B is a block diagram illustrating a power transmission circuit and a power reception circuit according to an electromagnetic wave scheme according to various embodiments.

FIG. 3B is a block diagram illustrating a power transmission circuit and a power reception circuit according to an electromagnetic wave scheme according to various embodiments. According to various embodiments, a power transmission circuit 109 may include an amplification circuit 331, a distribution circuit 332, a phase shifter 333, and an antenna array for power transmission 334. In various embodiments, the power reception circuit 159 may include an antenna for power reception 341, a rectification circuit 342, and a converting circuit 343.

The amplification circuit 331 may amplify a power provided from the power source 106 and provide the distribution circuit 332 with the amplified power. The amplification circuit 331 may be implemented as various amplifiers such as a drive amplifier (DA), a high power amplifier (HPA), a gain block amplifier (GBA), and/or the like, or a combination thereof, and there is no limitation to an example of the implementation. The distribution circuit 332 may distribute a power outputted from the amplification circuit 331 to a plurality of paths. There is no limitation as the distribution circuit 332 as long as it is a circuit capable of distributing an inputted power or signal to the plurality of paths. For example, the distribution circuit 332 may distribute a power to paths as many as the number of patch antennas included in the antenna array for power transmission 334. The phase shifter 333 may shift a phase (or delay) of each of a plurality of alternating current powers provided from the distribution circuit 332. The number of phase shifters 333 may be plural, and for example, the phase shifter 333 may be provided as many as the number of patch antennas included in the antenna array for power transmission 334. For example, a hardware element such as HMC642, HMC1113, and/or the like may be used as the phase shifter 333. Each shift degree by the phase shifter 333 may be controlled by a control circuit 102. The control circuit 102 may identify a location of an electronic device 150, and shift a phase of each of a plurality of alternating current powers so that an RF wave is constructively interfered, that is, the RF wave is beam-formed at the location of the electronic device 150 (e.g., a location of an antenna for power reception 314 of the electronic device 150). Each of the plurality of patch antennas included in the antenna array for power transmission 334 may generate sub RF waves based on a received power. An RF wave with which a sub RF wave is interfered may be converted into a current, a voltage, or a power in the antenna for power reception 341 and then outputted. The antenna for power reception 341 may include a plurality of patch antennas, and generate a current, a voltage, or a power of an alternating current waveform using an RF wave, i.e., an electromagnetic wave which is formed around the antenna for power reception 341, and this may be referred to as a received power. The rectification circuit 342 may rectify a received power to a direct current waveform. The converting circuit 343 may increase or decrease a voltage of a power of the direct current waveform to a preset voltage and output the power of the direct current waveform with the preset voltage to a PMIC 156.

At least one of the power transmission circuit 109 or the power reception circuit 159 according to various embodiments may include all of hardware according to an induction scheme or a resonance scheme in FIG. 3A and hardware according to an electromagnetic wave scheme in FIG. 3B. In this case, a control circuit 102 or a control circuit 152 may select a charging scheme according to various conditions, and control hardware which corresponds to the selected charging scheme to be driven. Alternatively, the control circuit 102 or the control circuit 152 may use all of the induction scheme, the resonance scheme, and the electromagnetic wave scheme, and may transmit and receive a power by driving all included hardware. The coil 321 which outputs an alternating current power using a surrounding magnetic field, or the antenna for power reception 341 which outputs an alternating current power using a surrounding RF wave may be referred to as a reception circuit.

Figure 4:
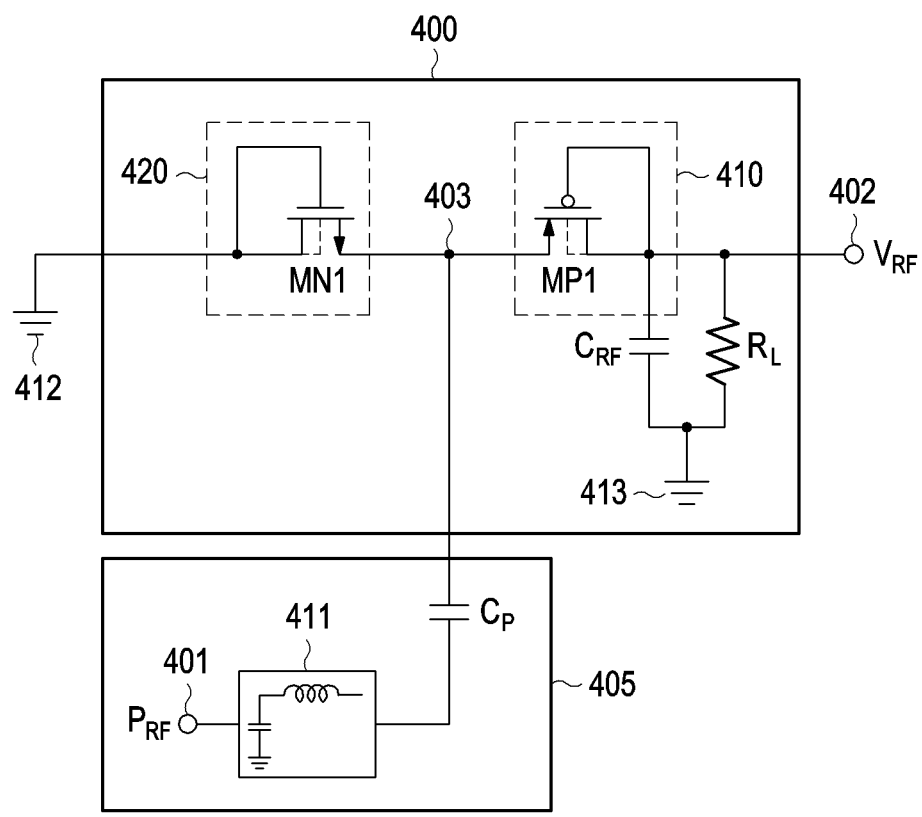
FIG. 4 is a diagram for describing a rectification circuit according to various embodiments.

FIG. 4 is a diagram for describing a rectification circuit according to various embodiments.

Referring to FIG. 4, a rectification circuit 400 may be connected to a reception circuit 405 via a node 403. The reception circuit 405 may include an input terminal 401, a matching circuit 411, and a capacitor ($C_P$). The input terminal 401 may be connected to a coil (e.g., a coil 321) for power reception or an antenna for power reception (e.g., an antenna 341). An alternating current power ($P_{RF}$) outputted from the coil (e.g., the coil 321) or the antenna for power reception (e.g., the antenna 341) may be provided to the input terminal 401. The matching circuit 411 is connected to the input terminal 401 and may include at least one of at least one capacitor or at least one coil. The matching circuit 411 may perform impedance matching between an electronic device 150 and a wireless power transmission device 100. The matching circuit 411 may be connected to the capacitor ($C_P$).

The alternating current power ($P_{RF}$) may be provided to the rectification circuit 400 via the input terminal 401, the matching circuit 411, and the capacitor ($C_P$).

The rectification circuit 400 may include a forward rectification circuit 410 and a reverse rectification circuit 420. The forward rectification circuit 410 may include a first P-MOSFET (MP1), and a source of the first P-MOSFET (MP1) may be connected to the node 403. The a reverse rectification circuit 420 may include a first N-MOSFET (MN1), and a source of the first N-MOSFET (MN1) may be connected to the node 403. A gate of the first N-MOSFET (MN1) is connected to a drain of the first N-MOSFET (MN1) and then connected to a ground 412, and a gate of the first P-MOSFET (MP1) is connected to a drain of the first P-MOSFET (MP1) and then connected to an output terminal 402. A capacitor ($C_{RF}$) and a resistor ($R_L$) may be connected in parallel to each other between the first P-MOSFET (MP1) and the output terminal 402, and the capacitor ($C_{RF}$) and the resistor ($R_L$) may be connected to a ground 413. An alternating current power from a reception circuit (e.g., the coil 321 or the antenna 341 for power reception) which receives a power may be provided to the input terminal 401. For example, a first power (e.g., a power by a positive voltage) may be applied to the input terminal 401 during a first period (e.g., during a first interval), and a second power (e.g., a power by a negative voltage) may be applied to the input terminal 401 during a second period (e.g., during a second interval). If the first power is applied to the input terminal 401, for example, during the first period, the first P-MOSFET (MP1) may be controlled to be in an on-state, so the first power may be provided to an output terminal 402 via the first P-MOSFET (MP1). If the second power is applied to the input terminal 401, for example, during the second period, the first P-MOSFET (MP1) may be controlled to be in an off-state, and the first N-MOSFET (MN1) may be controlled to be in the on-state, so the second power may be provided to a ground 412 and may not be provided the an output terminal 402. Accordingly, only the first power may be provided to the output terminal 402, so rectification for an alternating current power may be performed.

According to various embodiments, a transistor such as the first P-MOSFET (MP1) and the first N-MOSFET (MN1) may be implemented through a complementary metal-oxide semiconductor (CMOS) process, and a voltage (Vgs) applied between a gate and a source of the transistor may be limited to a designated voltage (e.g., 5V) in order for the transistor to operate normally. If a magnitude of a power applied to the input terminal 401 is large and the voltage (Vgs) between the gate and the source of the transistor such as the first P-MOSFET (MP1) and the first N-MOSFET (MN1) is larger than the designated voltage, the transistor may be damaged or malfunction, so a stable rectification operation may not be performed.

Figure 5:
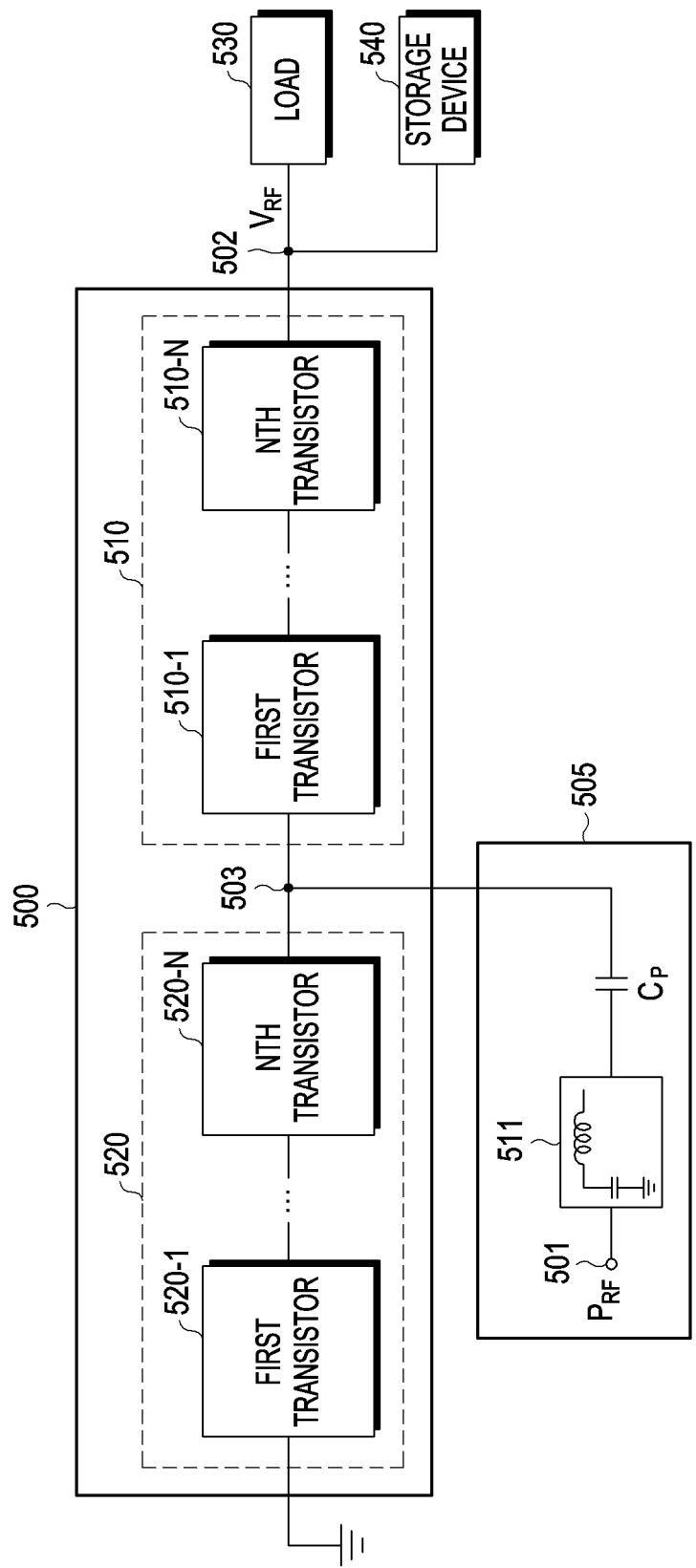
FIG. 5 is a diagram for describing a rectification circuit including a plurality of transistors according to various embodiments.

FIG. 5 is a diagram for describing a rectification circuit including a plurality of transistors according to various embodiments.

Referring to FIG. 5, a rectification circuit 500 may be connected to a reception circuit 505 via a node 503. The reception circuit 505 may include an input terminal 501, a matching circuit 511, and a capacitor ($C_P$). The input terminal 501 may be connected to a coil (e.g., a coil 321) for power reception or an antenna for power reception (e.g., an antenna 341). An alternating current power ($P_{RF}$) outputted from the coil (e.g., the coil 321) or the antenna for power reception (e.g., the antenna 341) may be provided to the input terminal 501. The matching circuit 511 is connected to the input terminal 501 and may include at least one of at least one capacitor or at least one coil. The matching circuit 511 may perform impedance matching between an electronic device 150 and a wireless power transmission device 100. The matching circuit 511 may be connected to the capacitor ($C_P$). The alternating current power ($P_{RF}$) may be provided to the rectification circuit 500 via the input terminal 501, the matching circuit 511, and the capacitor ($C_P$).

The rectification circuit 500 may include a forward rectification circuit 510 and a reverse rectification circuit 520. The forward rectification circuit 510 may include a plurality of first transistors 510-1 to 510-N, and the reverse rectification circuit 520 may include a plurality of second transistors 520-1 to 520-N. The first transistors 510-1 to 510-N may be connected in series, and the second transistors 520-1 to 520-N may also be connected in series. According to various embodiments, the number of the first transistors 510-1 to 510-N and the number of the second transistors 520-1 to 520-N may be a designated number. The designated number may be selectively designated based on a type and a characteristic, or a size of a received signal. According to various embodiments, the first transistors 510-1 to 510-N and the second transistors 520-1 to 520-N may include MOSFETs (e.g., P-MOSFETs or N-MOSFETs, or a combination of P-MOSFETs and N-MOSFETs).

One terminal (also referred to as a 'first terminal') of the forward rectification circuit 510 may be connected to the reception circuit 505 and the reverse rectification circuit 520 via a node 403, and another terminal (also referred to as a 'second terminal') of the forward rectification circuit 510 may be connected to the output terminal 502. One terminal (also referred to as a 'first terminal') of the reverse rectification circuit 520 may be connected to the reception circuit 505 and the forward rectification circuit 510, and another terminal (also referred to as a 'second terminal') of the reverse rectification circuit 520 may be connected to a ground.

An alternating current power from a reception circuit (e.g., the coil 321 or the antenna 341 for power reception) which receives a power may be provided to the input terminal 501. For example, a first power (e.g., a power by a positive voltage) may be applied to the input terminal 501 during a first period (e.g., during a first interval), and a second power (e.g., a power by a negative voltage) may be applied to the input terminal 501 during a second period (e.g., during a second interval).

If the first power is applied to the input terminal 501, for example, during the first period, the first transistors 510-1 to 510-N may be controlled to be in an on-state, so the first power may be provided to an output terminal 502 via the first transistors 510-1 to 510-N. If the second power is applied to the input terminal 501, for example, during the second period, the first transistors 510-1 to 510-N may be controlled to be in an off-state, and second transistors 520-1 to 520-N may be controlled to be in the on-state, so the second power may be provided to a ground 512 and may not be provided the an output terminal 502. Even though a magnitude of the first power applied to the input terminal 501 is large, the applied first power is distributed to each of the first transistors 510-1 to 510-N, so a voltage (Vgs) applied between a gate and a source of each of the first transistors 510-1 to 510-N, or a voltage (Vgd) applied between the gate and a drain of each of the first transistors 510-1 to 510-N may not be larger than a designated voltage. Accordingly, a voltage (VRF) according to the first power may be outputted to the output terminal 502, so rectification for an alternating current power may be performed. For example, when a 30 dBm RF signal is applied to the input terminal 501, a peak voltage of a Vp node may increase to about 15 v. If the first transistors 510-1 to 510-N are three transistors and the second transistors 520-1 to 520-N are three transistors, a voltage of 15V is distributed to each of the three transistors, so a voltage applied to Vgs and Vdg does not exceed 5 v, thereby improving stability of the rectification circuit 500.

The voltage (VRF) outputted in the output terminal 502 may be provided to each component of the electronic device 150 via a load 530 or may be provided to a storage device 540 such as a battery, thereby the storage device 540 may be charged.

As described above, the rectification circuit 500 according to various embodiments uses a plurality of transistors (e.g., first transistors 510-1 to 510-N) having a stacked structure in each of the forward rectification circuit 510 and the reverse rectification circuit 520. So, even if a magnitude of a power applied to the input terminal 501 is large, the applied power is distributed to each of the transistors, so it may be prevented that a voltage (Vgs) applied between a gate and a source of each of the transistors or a voltage (Vgd) applied between the gate and a drain of each of the transistors is larger than a designated voltage. According to an embodiment, even if a distance between a wireless power transmission device and an electronic device is close and a magnitude of a power applied to the input terminal 501 is large, the applied power is distributed to each of a plurality of transistors, so a voltage (Vgs) applied between a gate and a source of each of the plurality of transistors or a voltage (Vgd) applied between the gate and a drain of each of the plurality of transistors is not large, thereby transistors included in a rectification circuit may not be damaged or may not malfunction.

According to various embodiments, an electronic device 150 may include a reception circuit (e.g., a reception circuit 505 in FIG. 5) configured to wirelessly receive a power to output an alternating current power, and a rectification circuit (e.g., a rectification circuit 500 in FIG. 5) configured to rectify the alternating current power outputted from the reception circuit to output a rectified direct current power to an output terminal, wherein the rectification circuit may include a forward rectification circuit (e.g., a forward rectification circuit 510 in FIG. 5) and a reverse rectification circuit (e.g., a reverse rectification circuit 520 in FIG. 5), wherein a first terminal of the forward rectification circuit may be connected to the reception circuit and the reverse rectification circuit, a second terminal of the forward rectification circuit may be connected to the output terminal, and the forward rectification circuit may include first transistors (e.g., first transistors 510-1 to 510-N) configured to transfer the alternating current power to the output terminal during a first period, and wherein a first terminal of the reverse rectification circuit may be connected to the reception circuit and the forward rectification circuit, a second terminal of the reverse rectification circuit may be connected to a ground, and the reverse rectification circuit includes second transistors (e.g., second transistors 520-1 to 520-N in FIG. 5) configured to prevent the alternating current power from being transferred to the output terminal.

According to various embodiments, the first transistors may include first MOSFETs connected in series, and the second transistors may include second MOSFETs connected in series.

According to various embodiments, the first MOSFETs may include first N-MOSFETs, and the second MOSFETs may include second N-MOSFETs.

According to various embodiments, the rectification circuit may further include P-MOSFETs connected in parallel to each of the first N-MOSFETs, and P-MOSFETs connected in parallel to each of the second N-MOSFETs.

According to various embodiments, the first MOSFETs may include first P-MOSFETs, the second MOSFETs may include second P-MOSFETs, and the rectification circuit may further include N-MOSFETs connected in parallel to each of the first P-MOSFETs, and P-MOSFETs connected in parallel to each of the second N-MOSFETs.

According to various embodiments, the first MOSFETs may include a first N-MOSFET, a second N-MOSFET, a third N-MOSFET, and a fourth N-MOSFET, and the second MOSFETs may include a fifth N-MOSFET, a sixth N-MOSFET, a seventh N-MOSFET, and an eighth N-MOSFET.

According to various embodiments, a first gate and a first drain of the first N-MOSFET may be connected to the reception circuit, a first source of the first N-MOSFET may be connected to a second gate and a second drain of the second N-MOSFET, a second source of the second N-MOSFET may be connected to a third gate and a third drain of the third N-MOSFET, a third source of the third N-MOSFET may be connected to a fourth gate and a fourth drain of the fourth N-MOSFET, and a fourth source of the fourth N-MOSFET may be connected to the output terminal, and a fifth source of the fifth N-MOSFET may be connected to the reception circuit, a sixth source of the sixth N-MOSFET may be connected to a fifth gate and a fifth drain of the fifth N-MOSFET, and a seventh source of the seventh MOSFET may be connected to a sixth gate and a sixth drain of the sixth N-MOSFET, an eighth source of the eighth N-MOSFET may be connected to a seventh gate and a seventh drain of the seventh N-MOSFET, and a seventh gate and a seventh drain of the eighth N-MOSFET may be connected to the ground.

According to various embodiments, the rectification circuit may further include a loss compensation circuit configured to generate compensation voltages for compensating for a loss power of each of the first MOSFETs, and to provide each of the first MOSFETs with the compensation voltages.

According to various embodiments, the loss compensation circuit may include a first loss compensation circuit configured to generate the first compensation voltage using a gate voltage of a first MOSFET among the second MOSFETs, and to provide the first compensation voltage to a second MOSFET which corresponds to the first MOSFET among the first MOSFETs.

According to various embodiments, the electronic device may further include a sensing circuit configured to sense a magnitude of a voltage of a direct current power outputted from the rectification circuit, a buck-boost converter configured to perform a buck operation of decreasing a voltage of the outputted direct current power to a designated voltage based on the sensed magnitude of the voltage of the direct current power, or to perform a boost operation of increasing the voltage of the outputted direct current power to the designated voltage, and a charging unit configured to receive a power of the designated voltage and to perform a charging operation.

Figure 6:
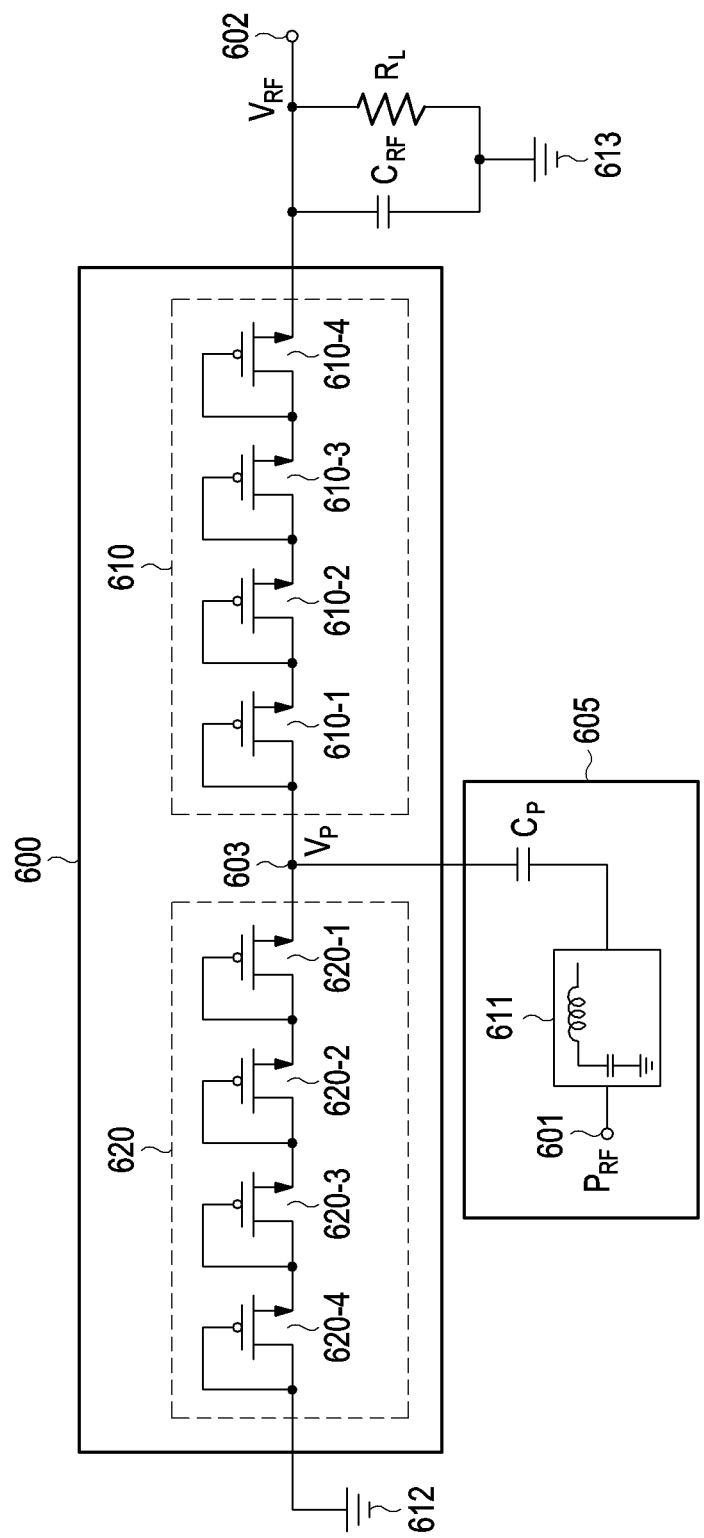
FIGS. 6 and 7 are diagrams illustrating an example of a rectification circuit including a plurality of transistors according to various embodiments.
Figure 7:
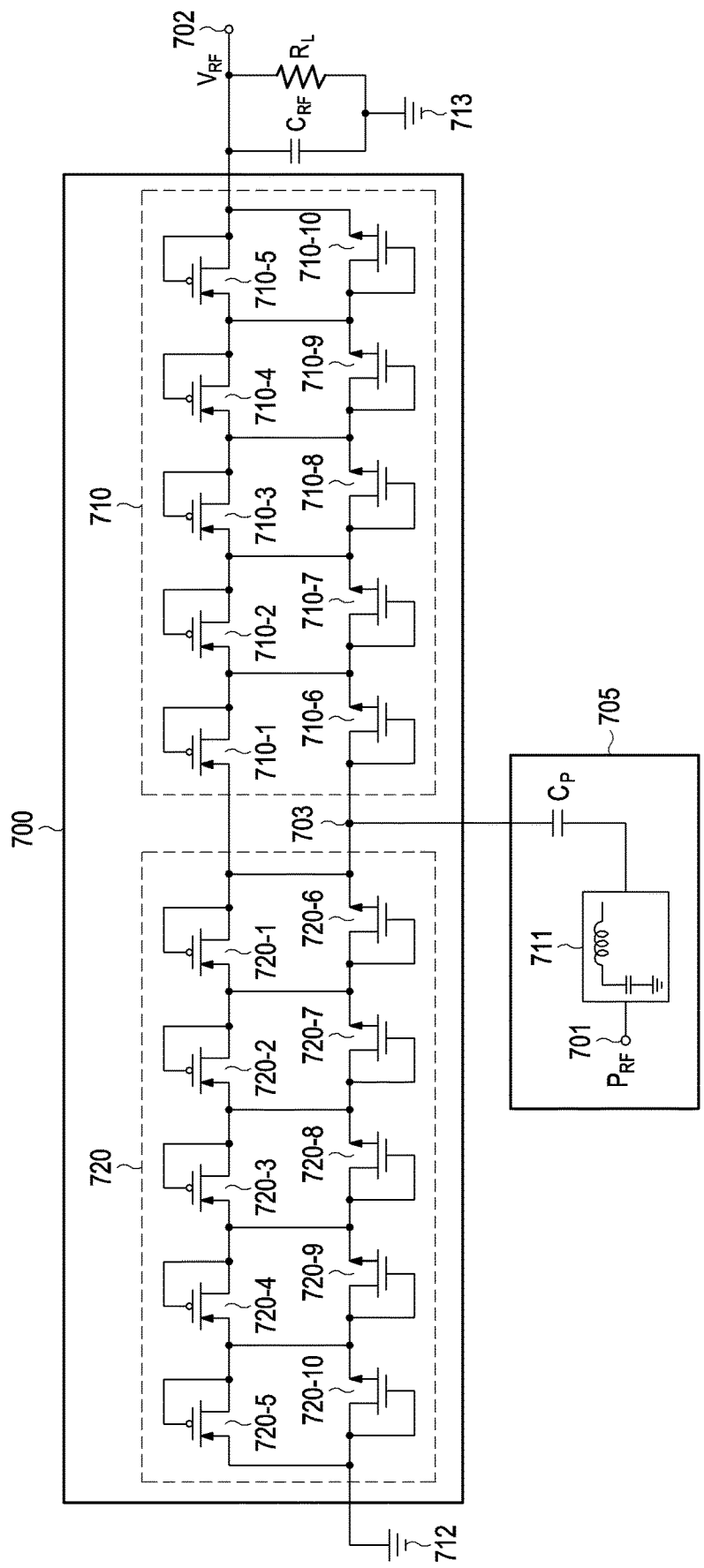

FIGS. 6 and 7 are diagrams illustrating an example of a rectification circuit including a plurality of transistors according to various embodiments.

Referring to FIG. 6, a rectification circuit 600 may be connected to a reception circuit 605 via a node 603. The reception circuit 605 may include an input terminal 601, a matching circuit 611, and a capacitor ($C_P$). The input terminal 601 may be connected to a coil (e.g., a coil 321) for power reception or an antenna for power reception (e.g., an antenna 341). An alternating current power ($P_{RF}$) outputted from the coil (e.g., the coil 321) or the antenna for power reception (e.g., the antenna 341) may be provided to the input terminal 601. The matching circuit 611 is connected to the input terminal 601 and may include at least one of at least one capacitor or at least one coil. The matching circuit 611 may perform impedance matching between an electronic device 150 and a wireless power transmission device 100. The matching circuit 611 may be connected to the capacitor ($C_P$). The alternating current power ($P_{RF}$) may be provided to the rectification circuit 600 via the input terminal 601, the matching circuit 611, and the capacitor ($C_P$).

The rectification circuit 600 may include a forward rectification circuit 610 and a reverse rectification circuit 620. The forward rectification circuit 610 may include a first N-MOSFET 610-1, a second N-MOSFET 610-2, a third N-MOSFET 610-3, and a fourth N-MOSFET 610-4. The reverse rectification circuit 620 may include a fifth N-MOSFET 620-1, a sixth N-MOSFET 620-2, a seventh N-MOSFET 620-3, and an eighth N-MOSFET 620-4.

A first gate and a first drain of the first N-MOSFET 610-1 may be connected to the reception circuit 605 via the node 603, a first source of the first N-MOSFET 610-1 may be connected to a second gate and a second drain of the second N-MOSFET 610-2, a second source of the second N-MOSFET 610-2 may be connected to a third gate and a third drain of the third N-MOSFET 610-3, a third source of the third N-MOSFET 610-3 may be connected to a fourth gate and a fourth drain of the fourth N-MOSFET 610-4, and a fourth source of the fourth N-MOSFET 610-4 may be connected to an output terminal 602. A capacitor ($C_{RF}$) and a resistor ($R_L$) may be connected in parallel to each other between the fourth source of the fourth N-MOSFET 610-4 and the output terminal 602, and the capacitor ($C_{RF}$) and the resistor ($R_L$) may be connected to a ground 613. A fifth source of the fifth N-MOSFET 620-1 may be connected to the reception circuit 605 via the node 603, a sixth source of the sixth N-MOSFET 620-2 may be connected to a fifth gate and a fifth drain of the fifth N-MOSFET 620-1, a seventh source of the seventh MOSFET 620-3 may be connected to a sixth gate and a sixth drain of the sixth N-MOSFET 620-2, an eighth source of the eighth N-MOSFET 620-4 may be connected to a seventh gate and a seventh drain of the seventh N-MOSFET 620-3, and an eighth gate and an eighth drain of the eighth N-MOSFET 620-4 may be connected to a ground 612.

A power of an alternating current waveform (e.g., a power of a sinusoidal waveform) may be applied to the input terminal 601. An alternating current power from a reception circuit (e.g., the coil 321 or the antenna 341 for power reception) which receives a power may be provided to the input terminal 601. For example, a first power (e.g., a power by a positive voltage) may be applied to the input terminal 601 during a first period (e.g., during a first time interval), and a second power (e.g., a power by a negative voltage) may be applied to the input terminal 601 during a second period (e.g., during a second time interval). If the first power is applied to the input terminal 601, for example, during the first period, each of the first N-MOSFET 610-1, the second N-MOSFET 610-2, the third N-MOSFET 610-3, and the fourth N-MOSFET 610-4 may be controlled to be in an on-state, so the first power may be provided to the output terminal 602 via the first N-MOSFET 610-1, the second N-MOSFET 610-2, the third N-MOSFET 610-3, and the fourth N-MOSFET 610-4. Even though a magnitude of the first power applied to the input terminal 601 is large, the applied first power is distributed to each of the first N-MOSFET 610-1, the second N-MOSFET 610-2, the third N-MOSFET 610-3, and the fourth N-MOSFET 610-4, so a voltage (Vgs) applied between a gate and a source of each of the first N-MOSFET 610-1, the second N-MOSFET 610-2, the third N-MOSFET 610-3, and the fourth N-MOSFET 610-4, or a voltage (Vgd) applied between the gate and a drain of each of the first N-MOSFET 610-1, the second N-MOSFET 610-2, the third N-MOSFET 610-3, and the fourth N-MOSFET 610-4 may not be larger than a designated voltage. If the second power is applied to the input terminal 601, for example, during the second period, each of the first N-MOSFET 610-1, the second N-MOSFET 610-2, the third N-MOSFET 610-3, and the fourth N-MOSFET 610-4 is controlled to be in an off-state, the fifth N-MOSFET 620-1, the sixth N-MOSFET 620-2, the seventh N-MOSFET 620-3, and the eighth N-MOSFET 620-4 are controlled to be in the on-state, so the second power may be provided to the ground 612 and may not be provided to the output terminal 602. Accordingly, a voltage (VRF) according to the first power may be outputted to the output terminal 602, so rectification for an alternating current power may be performed. The voltage (VRF) outputted in the output terminal 602 may be provided to each component of the electronic device 150 via a load or may be provided to a storage device such as a battery, thereby the storage device may be charged.

Referring to FIG. 7, a rectification circuit 700 may be connected to a reception circuit 705 via a node 703. The reception circuit 705 may include an input terminal 701, a matching circuit 711, and a capacitor ($C_P$). The input terminal 701 may be connected to a coil (e.g., a coil 321) for power reception or an antenna for power reception (e.g., an antenna 341). An alternating current power ($P_{RF}$) outputted from the coil (e.g., the coil 321) or the antenna for power reception (e.g., the antenna 341) may be provided to the input terminal 701. The matching circuit 711 is connected to the input terminal 701 and may include at least one of at least one capacitor or at least one coil. The matching circuit 711 may perform impedance matching between an electronic device 150 and a wireless power transmission device 100. The matching circuit 711 may be connected to the capacitor ($C_P$). The alternating current power ($P_{RF}$) may be provided to the rectification circuit 700 via the input terminal 701, the matching circuit 711, and the capacitor ($C_P$).

According to various embodiments, the rectification circuit 700 may include a forward rectification circuit 710 and a reverse rectification circuit 720. According to an embodiment, the forward rectification circuit 710 may include a first P-MOSFET 710-1, a second P-MOSFET 710-2, a third P-MOSFET 710-3, a fourth P-MOSFET 710-4, and a fifth P-MOSFET 710-5, and may further include a first N-MOSFET 710-6, a second N-MOSFET 710-7, a third N-MOSFET 710-8, a fourth N-MOSFET 710-9, and a fifth N-MOSFET 710-10 which are connected in parallel to the first P-MOSFET 710-1, the second P-MOSFET 710-2, the third P-MOSFET 710-3, the fourth P-MOSFET 710-4, and the fifth P-MOSFET 710-5, respectively.

According to an embodiment, the reverse rectification circuit 720 may include a sixth P-MOSFET 720-1, a seventh P-MOSFET 720-2, an eighth P-MOSFET 720-3, a ninth P-MOSFET 720-4, and a tenth P-MOSFET 720-5, and may further include a sixth N-MOSFET 720-6, a seventh N-MOSFET 720-7, an eighth N-MOSFET 720-8, a ninth N-MOSFET 720-9, and a tenth N-MOSFET 720-10 which are connected in parallel to the sixth P-MOSFET 720-1, the seventh P-MOSFET 720-2, the eighth P-MOSFET 720-3, the ninth P-MOSFET 720-4, and the tenth P-MOSFET 720-5, respectively.

A first source of the first P-MOSFET 710-1 may be connected to the reception circuit 705 via the node 703, a first gate and a first drain of the first P-MOSFET 710-1 may be connected to a second source of the second P-MOSFET 710-2, a second gate and a second drain of the second P-MOSFET 710-2 may be connected to a third source of the third P-MOSFET 710-3, a third gate and a third drain of the third P-MOSFET 710-3 may be connected to a fourth source of the fourth P-MOSFET 710-4, a fourth gate and a fourth drain of the fourth P-MOSFET 710-4 may be connected to a fifth source of the fifth P-MOSFET 710-5, and a fifth gate and a fifth drain of the fifth P-MOSFET 710-5 may be connected to an output terminal 702. A capacitor ($C_{RF}$) and a resistor ($R_L$) may be connected in parallel to each other between the fifth N-MOSFET 710-5 and the output terminal 702, and the capacitor ($C_{RF}$) and the resistor ($R_L$) may be connected to a ground 713.

A sixth gate and a sixth drain of the sixth P-MOSFET 720-1 may be connected to the reception circuit 705 via the node 703, a sixth source of the sixth P-MOSFET 720-1 may be connected to a seventh gate and a seventh drain of the seventh P-MOSFET 720-2, a seventh source of the seventh P-MOSFET 720-2 may be connected to an eighth gate and an eighth drain of the eighth P-MOSFET 720-3, an eighth source of the eighth P-MOSFET 720-3 may be connected to a ninth gate and a ninth drain of the ninth P-MOSFET 720-4, a ninth source of the ninth P-MOSFET 720-4 may be connected to a tenth gate and a tenth drain of the tenth P-MOSFET 720-5, and a tenth source of the tenth P-MOSFET 720-5 may be connected to a ground 712.

A power of an alternating current waveform (e.g., a power of a sinusoidal waveform) may be applied to the input terminal 701. An alternating current power from a reception circuit (e.g., the coil 321 or the antenna 341 for power reception) which receives a power may be provided to the input terminal 701. For example, a first power (e.g., a power by a positive voltage) may be applied to the input terminal 701 during a first period (e.g., during a first time interval), and a second power (e.g., a power by a negative voltage) may be applied to the input terminal 701 during a second period (e.g., during a second time interval). If the first power is applied to the input terminal 701, for example, during the first period, each of the first to fifth N-MOSFETs 710-1 to 710-5, and the first to fifth P-MOSFETs 710-6 to 710-10 may be controlled to be in an on-state, so the first power may be provided to the output terminal 702 via the first to fifth N-MOSFETs 710-1 to 710-5 and the first to fifth P-MOSFETs 710-6 to 710-10. Even though a magnitude of the first power applied to the input terminal 701 is large, the applied first power is distributed to each of the first to fifth N-MOSFETs 710-1 to 710-5 and the first to fifth P-MOSFETs 710-6 to 710-10, so a voltage (Vgs) applied between a gate and a source of each of the first to fifth N-MOSFETs 710-1 to 710-5 and the first to fifth P-MOSFETs 710-6 to 710-10, or a voltage (Vgd) applied between the gate and a drain of each of the first to fifth N-MOSFETs 710-1 to 710-5 and the first to fifth P-MOSFETs 710-6 to 710-10 may not be larger than a designated voltage. If the second power is applied to the input terminal 701, for example, during the second period, each of the first to fifth N-MOSFETs 710-1 to 710-5 is controlled to be in an off-state, and each of the sixth to tenth N-MOSFETs 720-1 to 720-5 and the sixth to tenth P-MOSFETs 720-6 to 720-10 are controlled to be in the on-state, so the second power may be provided to the ground 712 and may not be provided to the output terminal 702. Accordingly, a voltage (VRF) according to the first power may be outputted to the output terminal 702, so rectification for an alternating current power may be performed. The voltage (VRF) outputted in the output terminal 702 may be provided to each component of the electronic device 150 via a load or may be provided to a storage device such as a battery, thereby the storage device may be charged.

Figure 8:
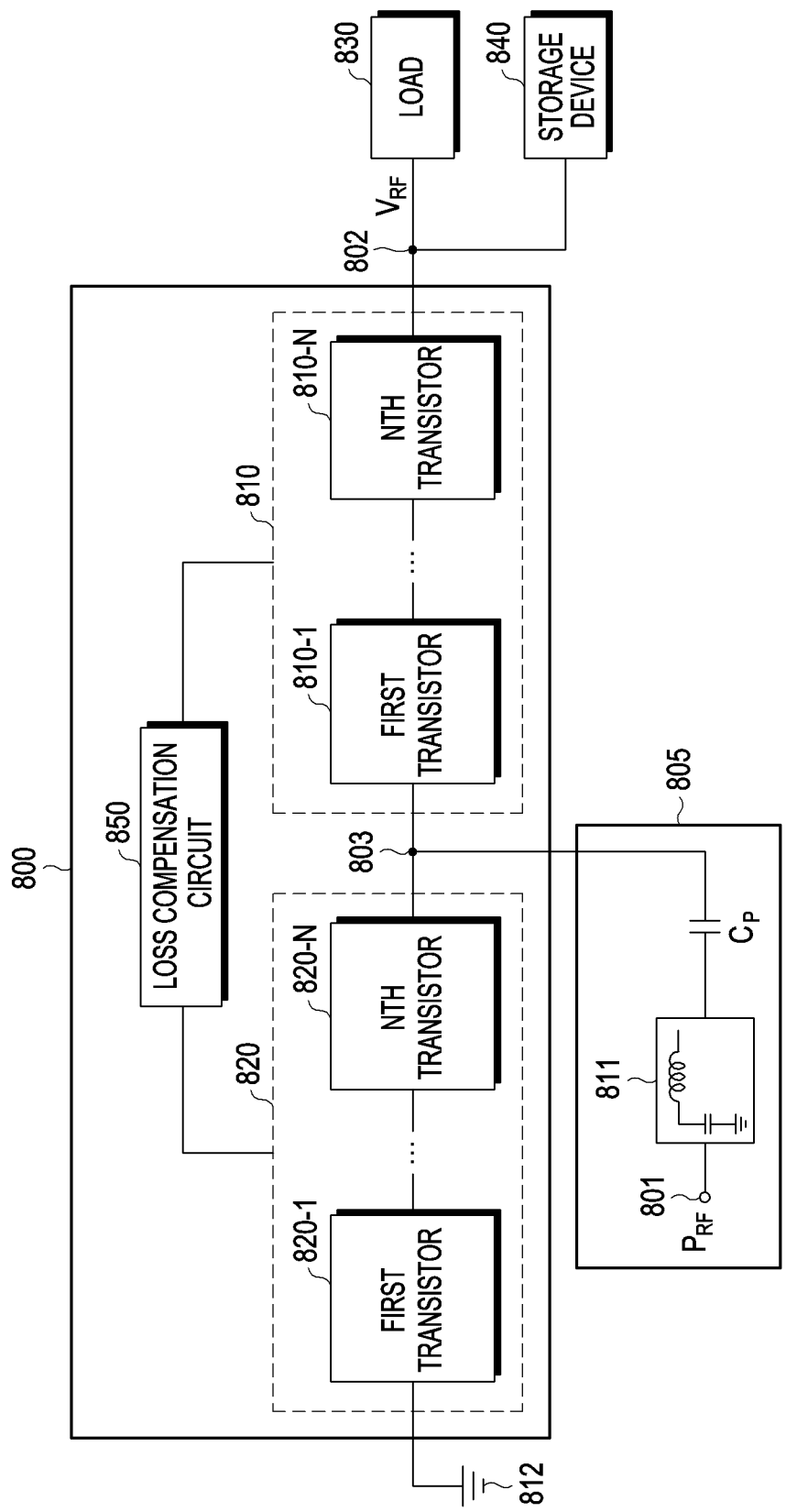
FIG. 8 is a diagram for describing a rectification circuit including a plurality of transistors and a loss compensation circuit according to various embodiments.

FIG. 8 is a diagram for describing a rectification circuit including a plurality of transistors and a loss compensation circuit according to various embodiments.

Referring to FIG. 8, a rectification circuit 800 according to various embodiments may further include a loss compensation circuit 850 compared to FIG. 5.

According to various embodiments, there may be a lost voltage in each of a first to Nth transistors 810-1 to 810-N of a forward rectification circuit 810 due to internal resistance of the first to Nth transistors 810-1 to 810-N of the forward rectification circuit 810. According to various embodiments, the lost voltage in each of the first to Nth transistors 810-1 to 810-N of the forward rectification circuit 810 may be compensated using the loss compensation circuit 850.

The loss compensation circuit 850 may generate compensation voltages for compensating for a lost power in each of the first to Nth transistors 810-1 to 810-N of the forward rectification circuit 810, and provide the generated compensation voltages to each of the first to Nth transistors 810-1 to 810-N of the forward rectification circuit 810. According to an embodiment, the compensation voltages may boost a voltage of each of the first to Nth transistors 810-1 to 810-N of the forward rectification circuit 810 to a designated voltage, for example, a threshold voltage of the first to Nth transistors 810-1 to 810-N or 5V.

An alternating current power from a reception circuit (e.g., the coil 321 or the antenna 341 for power reception) which receives a power may be provided to the input terminal 801. For example, a first power (e.g., a power by a positive voltage) may be applied to the input terminal 801 during a first period (e.g., during a first interval), and a second power (e.g., a power by a negative voltage) may be applied to the input terminal 801 during a second period (e.g., during a second interval).

If the first power is applied to the input terminal 801, for example, during the first period, the first transistors 810-1 to 810-N may be controlled to be in an on-state, so the first power may be provided to an output terminal 802 via the first transistors 810-1 to 810-N. If the second power is applied to the input terminal 801, for example, during the second period, the first transistors 810-1 to 810-N may be controlled to be in an off-state, and second transistors 820-1 to 820-N may be controlled to be in the on-state, so the second power may be provided to a ground 812 and may not be provided the an output terminal 802. Even though a magnitude of the first power applied to the input terminal 801 is large, the applied first power is distributed to each of the first transistors 810-1 to 810-N, so a voltage (Vgs) applied between a gate and a source of each of the first transistors 810-1 to 810-N, or a voltage (Vgd) applied between the gate and a drain of each of the first transistors 810-1 to 810-N may not be larger than a designated voltage. Accordingly, a voltage (VRF) according to the first power may be outputted to the output terminal 802, so rectification for an alternating current power may be performed. The voltage (VRF) outputted in the output terminal 802 may be provided to each component of the electronic device 150 via a load 830 or may be provided to a storage device 840 such as a battery, thereby the storage device 840 may be charged.

The loss compensation circuit 850 may include a first to Nth loss compensation circuits which generate each of a first compensation voltage to an Nth compensation voltage using a gate voltage of each of the first to Nth transistors 820-1 to 820-N of the reverse rectification circuit 810, and each of the first to Nth loss compensation circuits may provide each of the first to Nth transistors 820-1 to 820-N with each of the first compensation voltage to an Nth compensation voltage.

Figure 9:
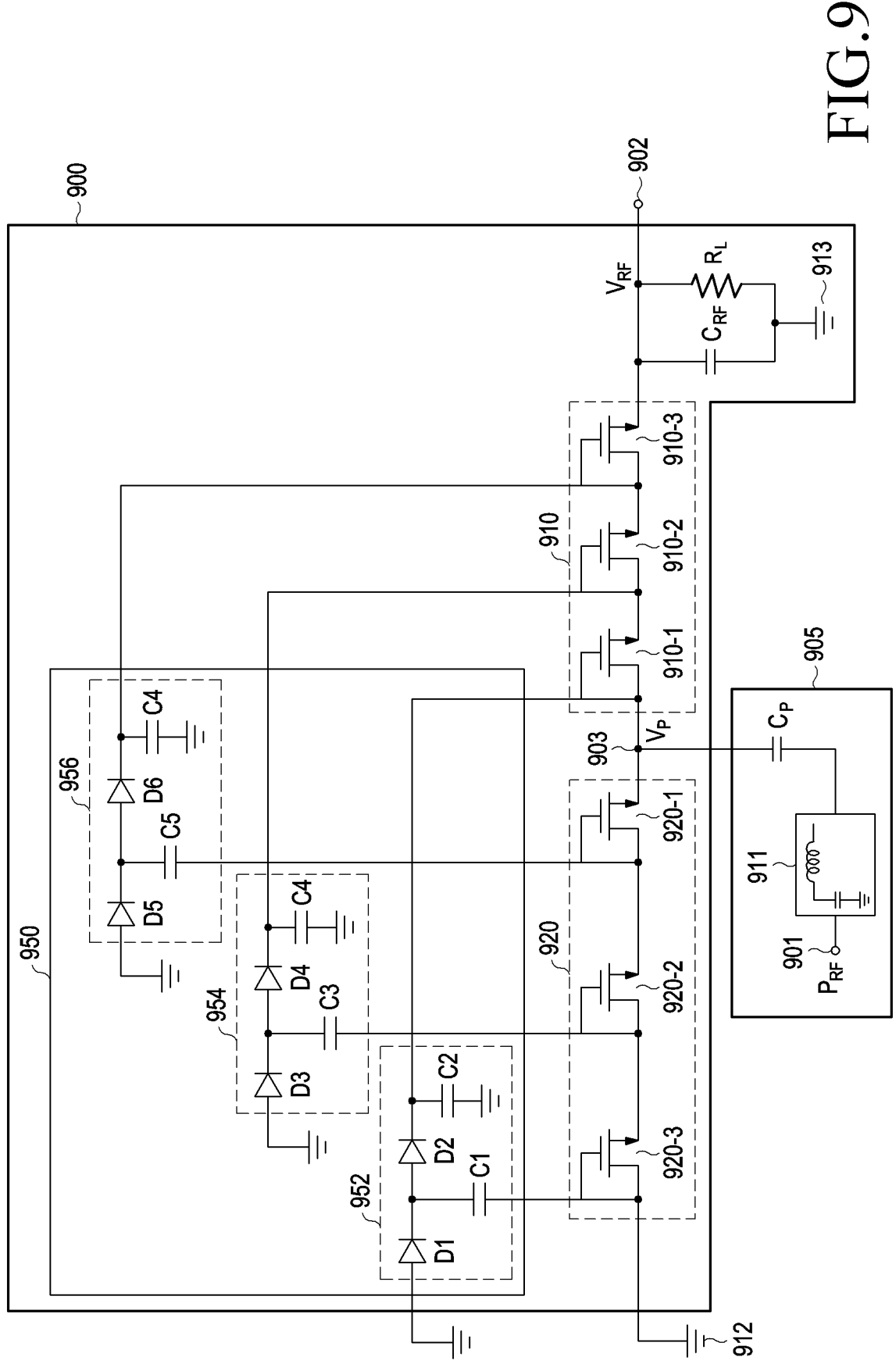
FIG. 9 is a diagram illustrating an example of a rectification circuit including a plurality of transistors and a loss compensation circuit according to various embodiments.

FIG. 9 is a diagram illustrating an example of a rectification circuit including a plurality of transistors and a loss compensation circuit according to various embodiments.

Referring to FIG. 9, a rectification circuit 900 may be connected to a reception circuit 905 via a node 903. The reception circuit 905 may include an input terminal 901, a matching circuit 911, and a capacitor ($C_P$). The input terminal 901 may be connected to a coil (e.g., a coil 321) for power reception or an antenna for power reception (e.g., an antenna 341). An alternating current power ($P_{RF}$) outputted from the coil (e.g., the coil 321) or the antenna for power reception (e.g., the antenna 341) may be provided to the input terminal 901. The matching circuit 911 is connected to the input terminal 901 and may include at least one of at least one capacitor or at least one coil. The matching circuit 911 may perform impedance matching between an electronic device 150 and a wireless power transmission device 100. The matching circuit 911 may be connected to the capacitor ($C_P$). The alternating current power ($P_{RF}$) may be provided to the rectification circuit 900 via the input terminal 901, the matching circuit 911, and the capacitor ($C_P$).

According to various embodiments, the rectification circuit 900 may include a forward rectification circuit 910, a reverse rectification circuit 920, and a loss compensation circuit 950.

According to an embodiment, the forward rectification circuit 910 may include a first N-MOSFET 910-1, a second N-MOSFET 910-2, and a third N-MOSFET 910-3, and the reverse rectification circuit 920 may include a fourth N-MOSFET 920-1, a fifth N-MOSFET 920-2, and a sixth N-MOSFET 920-3. According to various embodiments, the number of MOSFETs included in the forward rectification circuit 910 and the reverse rectification circuit 920 may be larger or smaller, a P-MOSFET may be included instead of an N-MOSFET, and all of the N-MOSFET and the P-MOSFET may be included.

A first gate and a first drain of the first N-MOSFET 910-1 may be connected to the reception circuit 905 via the node 903, a first source of the first N-MOSFET 910-1 may be connected to a second gate and a second drain of the second N-MOSFET 910-2, a second source of the second N-MOSFET 910-2 may be connected to a third gate and a third drain of the third N-MOSFET 910-3, and a third source of the third N-MOSFET 910-3 may be connected to an output terminal 902. A capacitor ($C_{RF}$) and a resistor ($R_L$) may be connected in parallel to each other between the third source of the third N-MOSFET 910-3 and the output terminal 902, and the capacitor ($C_{RF}$) and the resistor ($R_L$) may be connected to a ground 913.

A fourth source of the fourth N-MOSFET 920-1 may be connected to the reception circuit 905 via the node 903, a fifth source of the fifth N-MOSFET 920-2 may be connected to a fourth gate and a fourth drain of the fourth N-MOSFET 920-1, a sixth source of the sixth N-MOSFET 920-3 may be connected to a fifth gate and a fifth drain of the fifth N-MOSFET 920-2, and a sixth gate and a sixth drain of the sixth N-MOSFET 920-3 may be connected to a ground 912.

A power of an alternating current waveform (e.g., a power of a sinusoidal waveform) may be applied to the input terminal 901. An alternating current power from a reception circuit (e.g., the coil 321 or the antenna 341 for power reception) which receives a power may be provided to the input terminal 901. For example, a first power (e.g., a power by a positive voltage) may be applied to the input terminal 901 during a first period (e.g., during a first interval), and a second power (e.g., a power by a negative voltage) may be applied to the input terminal 901 during a second period (e.g., during a second interval). If the first power is applied to the input terminal 901, for example, during the first period, each of the first N-MOSFET 910-1, the second N-MOSFET 910-2, and the third N-MOSFET 910-3 may be controlled to be in an on-state, so the first power may be provided to the output terminal 902 via the first N-MOSFET 910-1, the second N-MOSFET 910-2, and the third N-MOSFET 910-3. Even though a magnitude of the first power applied to the input terminal 901 is large, the applied first power is distributed to each of the first N-MOSFET 910-1, the second N-MOSFET 910-2, and the third N-MOSFET 910-3, so a voltage (Vgs) applied between a gate and a source of each of the first N-MOSFET 910-1, the second N-MOSFET 910-2, and the third N-MOSFET 910-3, or a voltage (Vgd) applied between the gate and a drain of each of the first N-MOSFET 910-1, the second N-MOSFET 910-2, and the third N-MOSFET 910-3 may not be larger than a designated voltage.

If the second power is applied to the input terminal 901, for example, during the second period, each of the first N-MOSFET 910-1, the second N-MOSFET 910-2, and the third N-MOSFET 910-3 is controlled to be in an off-state, the fourth N-MOSFET 920-1, the fifth N-MOSFET 920-2, and the sixth N-MOSFET 920-3 are controlled to be in the on-state, so the second power may be provided to the ground 912 and may not be provided to the output terminal 902. Accordingly, a voltage (VRF) according to the first power may be outputted to the output terminal 902, so rectification for an alternating current power may be performed. The voltage (VRF) outputted in the output terminal 902 may be provided to each component of the electronic device 150 via a load or may be provided to a storage device such as a battery, thereby the storage device may be charged.

According to various embodiments, the loss compensation circuit 950 may be connected between the forward rectification circuit 910 and the reverse rectification circuit 920. According to an embodiment, the loss compensation circuit 950 may generate compensation voltages for compensating for a lost power in each of the first N-MOSFET 910-1, the second N-MOSFET 910-2, and the third N-MOSFET 910-3 in the forward rectification circuit 910 using a gate voltage of each of the fourth N-MOSFET 920-1, the fifth N-MOSFET 920-2, and the sixth N-MOSFET 920-3 in the reverse rectification circuit 920, and provide each of the generated compensation voltages to each of the first N-MOSFET 910-1, the second N-MOSFET 910-2, and the third N-MOSFET 910-3.

According to an embodiment, the loss compensation circuit 950 may include a first loss compensation circuit 952, a second loss compensation circuit 954, and a third loss compensation circuit 956. The first loss compensation circuit 952 may be connected between a gate of the first N-MOSFET 910-1 and a gate of the fourth N-MOSFET 920-1, and may include at least one diode (D1 and D2) and at least one capacitor (C1 and C2). The first loss compensation circuit 952 may compensate for a lost power of the first N-MOSFET 910-1 by boosting a voltage applied to the gate of the first N-MOSFET 910-1 to a designated voltage using a gate voltage of the fourth N-MOSFET 920-1. The second loss compensation circuit 954 may be connected between a gate of the second N-MOSFET 910-2 and a gate of the fifth N-MOSFET 920-2, and may include at least one diode (D1 and D2) and at least one capacitor (C1 and C2). The second loss compensation circuit 954 may compensate for a lost power of the second N-MOSFET 910-2 by boosting a voltage applied to the gate of the second N-MOSFET 910-2 to a designated voltage using a gate voltage of the fifth N-MOSFET 920-2. The third loss compensation circuit 956 may be connected between a gate of the third N-MOSFET 910-3 and a gate of the sixth N-MOSFET 920-3, and may include at least one diode (D1 and D2) and at least one capacitor (C1 and C2). The third loss compensation circuit 956 may compensate for a lost power of the third N-MOSFET 910-3 by boosting a voltage applied to the gate of the third N-MOSFET 910-3 to a designated voltage using a gate voltage of the sixth N-MOSFET 920-3.

Figure 10:
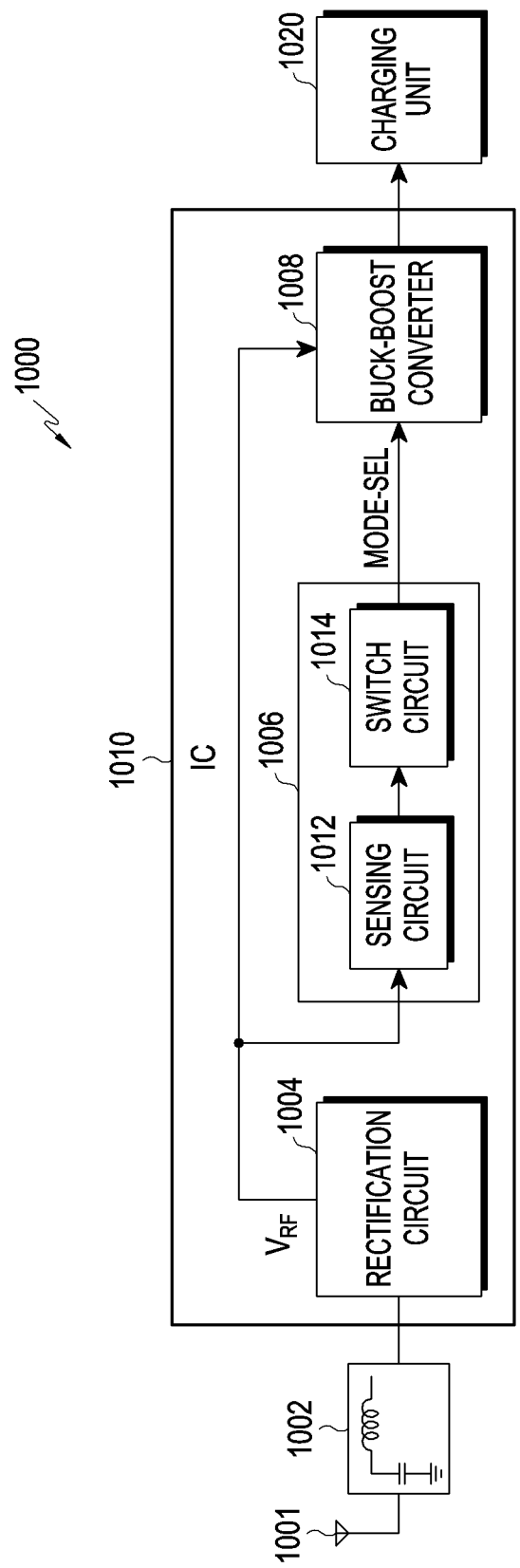
FIG. 10 is a block diagram illustrating an electronic device including a rectification circuit according to various embodiments of the present disclosure.

FIG. 10 is a block diagram illustrating an electronic device including a rectification circuit according to various embodiments of the present disclosure.

Referring to FIG. 10, an electronic device 1000 according to various embodiments may include an antenna for power reception 1001, a matching circuit 1002, a rectification circuit 1004, a control circuit 1006, and a buck-boost converter 1008, and a charging unit 1020. According to an embodiment, the matching circuit 1002, the rectification circuit 1004, the control circuit 1006, and the buck-boost converter 1008 may be independently included in the electronic device 1000, or may be included in the electronic device 1000 in an integrated chip (IC) 1010 form.

The antenna for power reception 1001 may output an alternating current power using an RF wave formed around the antenna for power reception 1001.

The matching circuit 1002 may include at least one of at least one capacitor or at least one inductor connected to the antenna for power reception 1001, so the matching circuit 1002 may change an impedance (or a load) connected to the antenna for power reception 1001.

The rectification circuit 1004 may receive and rectify the alternating current power outputted from the antenna for power reception 1001, and output a rectified direct current power. The rectification circuit 1004 may be a rectification circuit according to an embodiment of one of FIG. 5, 6, 7, 8, or 9.

The control circuit 1006 may control to perform a buck operation mode of decreasing a voltage of the outputted direct current power to a designated voltage, or to perform a boost mode of increasing the voltage of the outputted direct current power to the designated voltage, based on a magnitude of the voltage of the direct current power outputted from the rectification circuit 1004. The control circuit 1006 may include a sensing circuit 1012 and a switch circuit 1014. The sensing circuit 1012 may sense the voltage of the direct current power outputted from the rectification circuit 1004. The switch circuit 1014 may perform switching for selecting the buck mode of decreasing the voltage of the outputted direct current power to the designated voltage, or for selecting the boost mode of increasing the voltage of the outputted direct current power to the designated voltage, based on the magnitude of the voltage of the sensed direct current power. For example, the designated voltage may be 5V.

The direct current power outputted from the rectification circuit 1004 may be provided to the buck-boost converter 1008, and the buck-boost converter 1008 may decrease the voltage of the outputted direct current power to the designated voltage to output the decreased voltage in the buck mode, and increase the voltage of the outputted direct current power to the designated voltage to output the increased voltage in the boost mode.

The charging unit 1020 may include an energy storage device such as a battery, and/or the like, and may receive and store a power of a voltage designated by the buck-boost converter 1008. According to an embodiment, a power of the voltage designated by the buck-boost converter 1008 may be provided to each module (e.g., a communication module, and/or the like) of the electronic device 1000 via a load unit.

Figure 11:
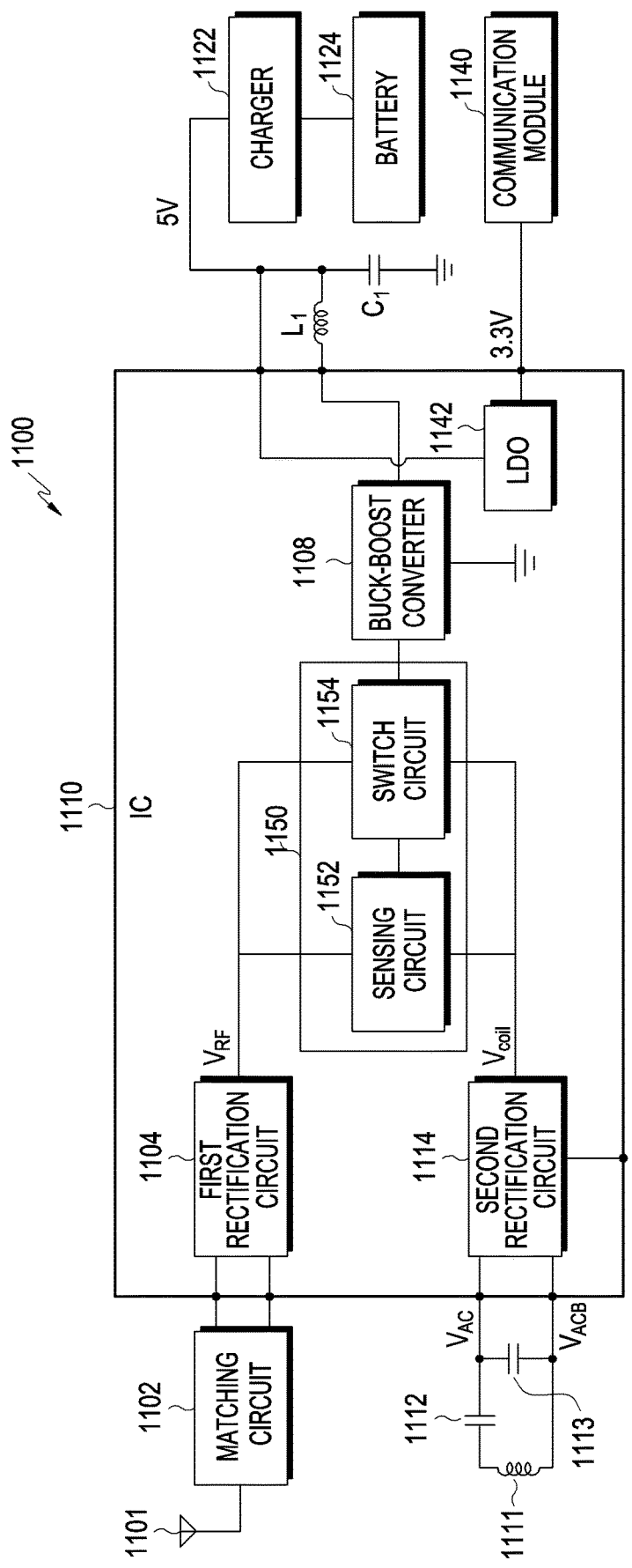
FIG. 11 is a block diagram illustrating an electronic device including an electromagnetic wave scheme-rectification circuit and a resonance scheme-rectification circuit according to various embodiments of the present disclosure.

FIG. 11 is a block diagram illustrating an electronic device including an electromagnetic wave scheme-rectification circuit and a resonance scheme-rectification circuit according to various embodiments of the present disclosure.

Referring to FIG. 11, an electronic device 1100 may include an antenna for power reception 1101, a matching circuit 1102, a first rectification circuit 1104, a coil for power reception 1111, capacitors 1112 and 1113, a second rectification circuit 1114, a control circuit 1150, a buck-boost converter 1108, a linear drop out (LDO) regulator 1142, a charger 1122, a battery 1124, a communication module 1140, an inductor (L1), and/or a capacitor (C1). For example, an alternating current power (hereinafter, also referred to as a 'first alternating current power') which is received in an electromagnetic wave scheme may be received and rectified via the antenna for power reception 1101, the matching circuit 1102, and the first rectification circuit 1104, and an alternating current power (hereinafter, also referred to as a 'second alternating current power') which is received in a resonance scheme may be received and rectified via the coil for power reception 1111, the capacitors 1112 and 1113, and the second rectification circuit 1114.

According to an embodiment, at least some of components included in the electronic device 1100 may be integrated into an integrated chip (IC) to be included in the electronic device 1100. For example, the first rectification circuit 1104, the second rectification circuit 1114, the control circuit 1150, the buck-boost converter 1108, the linear drop out (LDO) regulator 1142 may be included in the electronic device 1100 as an integrated chip (IC) 1110.

The antenna for power reception 1101 may output an alternating current power using an RF wave formed around the antenna for power reception 1001.

The matching circuit 1102 may include at least one of at least one capacitor or at least one inductor connected to the antenna for power reception 1101, so the matching circuit 1102 may change an impedance (or a load) connected to the antenna for power reception 1101.

The first rectification circuit 1104 may receive and rectify a first alternating current power outputted from the antenna for power reception 1101, and output a rectified first direct current power (VRF). The first rectification circuit 1104 may be a rectification circuit according to an embodiment of one of FIG. 5, 6, 7, 8, or 9.

The coil for power reception 1111 and the capacitors 1112 and 1113 may constitute a resonance circuit, and may receive the first alternating current power (e.g., a power of 6.78 MHz) via resonance. VAC and VACB may be applied to both terminals of the resonant circuit, the first alternating current power received in the resonant circuit may be rectified by the second rectification circuit 1114, and a rectified second direct current power (VCoil) may be outputted.

The control circuit 1150 may control to select one of the first direct current power (VRF) and the second direct current power (VCoil) based on magnitudes of the first direct current power (VRF) and the second direct current power (VCoil) which are rectified from the first rectification circuit 1104 or the second rectification circuit 1114, and control to provide the buck-boost converter 1108 with the selected power. The control circuit 1150 may control to perform a buck operation mode of decreasing a voltage of the selected power to a designated voltage magnitude, or to perform a boost mode of increasing the voltage of the selected power to the designated voltage magnitude, based on the voltage of the selected power. According to various embodiments, the control circuit 1150 may include a sensing circuit 1152 and a switch circuit 1154. The sensing circuit 1152 may sense magnitudes of the first direct current power (VRF) and the second direct current power (VCoil) which are rectified from the first rectification circuit 1104 or the second rectification circuit 1114. The switch circuit 1154 may perform first switching for selecting one of the first direct current power (VRF) and the second direct current power (VCoil) based on magnitudes of the first direct current power (VRF) and the second direct current power (VCoil), or perform second switching for selecting a buck operation mode of decreasing a voltage magnitude of the selected power to a designated voltage magnitude, or for selecting a boost mode of increasing the voltage magnitude of the selected power to the designated voltage magnitude, based on the voltage of the selected power. For example, a designated voltage may be 5V.

The first direct current power (VRF) or the second direct current power (VCoil) may be provided from the first rectification circuit 1104 or the second rectification circuit 1114 to the buck-boost converter 1108, and the buck-boost converter 1108 may decrease the voltage of the first direct current power (VRF) or the second direct current power (VCoil) to the designated voltage in the buck operation mode, or may increase the voltage of the first direct current power (VRF) or the second direct current power (VCoil) to the designated voltage to output the increased power in the boost mode.

The charger 1122 may charge the battery 1024 using the power of the designated voltage (e.g., 5V) outputted by the buck-boost converter 1108. The LDO regulator 1142 may convert the designated voltage (e.g., 5V) of the power outputted by the buck-boost converter 1108 into a voltage for communication module (e.g., 3.3V) to provide the communication module 1140 with the converted voltage.

An electronic device (e.g., an electronic device 1100 in FIG. 11) according to various embodiments may include a first reception circuit (e.g., a first reception circuit in FIG. 11 (e.g., an antenna for power reception 1101 and a matching circuit 1102 in FIG. 11)) configured to output a first alternating current power received via an electromagnetic wave, a second reception circuit (e.g., a coil for power reception 1111 and capacitors 1112 and 1113 in FIG. 11) configured to output a second alternating current power received via resonance, a first rectification circuit (e.g., a first rectification circuit 1104 in FIG. 11) configured to rectify the first alternating current power outputted from the first reception circuit to output a rectified first direct current power, a second rectification circuit (e.g., a second rectification circuit 1114 in FIG. 11) configured to rectify the second alternating current power outputted from the second reception circuit to output a rectified second direct current power, and a switch circuit (e.g., a switch circuit 1154 in FIG. 11) configured to output a power whose magnitude is larger among the first direct current power and the second direct current power, wherein the first rectification circuit may include a forward rectification circuit and a reverse rectification circuit, wherein a first terminal of the forward rectification circuit may be connected to the first reception circuit and the reverse rectification circuit, a second terminal of the forward rectification circuit may be connected to the switch circuit, and the forward rectification circuit may include first transistors configured to transfer the first alternating current power to the switch circuit during a first period, and wherein a first terminal of the reverse rectification circuit may be connected to the first reception circuit and the forward rectification circuit, a second terminal of the reverse rectification circuit may be connected to a ground, and the reverse rectification circuit may include second transistors configured to prevent the first alternating current power from being transferred to the switch circuit.

According to various embodiments, the first transistors may include first MOSFETs connected in series, and the second transistors may include second MOSFETs connected in series.

According to various embodiments, the first MOSFETs may include first N-MOSFETs, and the second MOSFETs may include second N-MOSFETs.

According to various embodiments, the electronic device may further include P-MOSFETs connected in parallel to each of the first N-MOSFETs, and P-MOSFETs connected in parallel to each of the second N-MOSFETs.

According to various embodiments, the first MOSFETs may include first P-MOSFETs, the first MOSFETs may include second P-MOSFETs, and the electronic device may further include N-MOSFETs connected in parallel to each of the first P-MOSFETs, and P-MOSFETs connected in parallel to each of the second N-MOSFETs.

According to various embodiments, the first MOSFETs may include a first N-MOSFET, a second N-MOSFET, a third N-MOSFET, and a fourth N-MOSFET, and the second MOSFETs may include a fifth N-MOSFET, a sixth N-MOSFET, a seventh N-MOSFET, and an eighth N-MOSFET.

According to various embodiments, a first gate and a first drain of the first N-MOSFET may be connected to the first reception circuit, a first source of the first N-MOSFET may be connected to a second gate and a second drain of the second N-MOSFET, a second source of the second N-MOSFET may be connected to a third gate and a third drain of the third N-MOSFET, a third source of the third N-MOSFET may be connected to a fourth gate and a fourth drain of the fourth N-MOSFET, and a fourth source of the fourth N-MOSFET may be connected to the switch circuit, and a fifth source of the fifth N-MOSFET may be connected to the first reception circuit, a sixth source of the sixth N-MOSFET may be connected to a fifth gate and a fifth drain of the fifth N-MOSFET, a seventh source of the seventh MOSFET may be connected to a sixth gate and a sixth drain of the sixth N-MOSFET, an eighth source of the eighth N-MOSFET may be connected to a seventh gate and a seventh drain of the seventh N-MOSFET, and a eighth gate and a eighth drain of the eighth N-MOSFET may be connected to the ground.

According to various embodiments, the electronic device may further include a loss compensation circuit configured to generate compensation voltages for compensating for a loss power of each of the first MOSFETs, and to provide each of the first MOSFETs with the compensation voltages, and the loss compensation circuit may include a first loss compensation circuit configured to generate the first compensation voltage using a gate voltage of a first MOSFET among the second MOSFETs, and to provide the first compensation voltage to a second MOSFET which corresponds to the first MOSFET among the first MOSFETs.

According to various embodiments, the electronic device may further include a sensing circuit configured to sense a magnitude of a voltage of the first direct current power and a magnitude of a voltage of the second direct current power, a buck-boost converter configured to perform a buck operation of decreasing a voltage of the direct current power outputted from the switch circuit to a designated voltage, or to perform a boost operation of increasing the voltage of the direct current power outputted from the switch circuit to the designated voltage, and a charging unit configured to receive a power of the designated voltage and to perform a charging operation.

Figure 12:
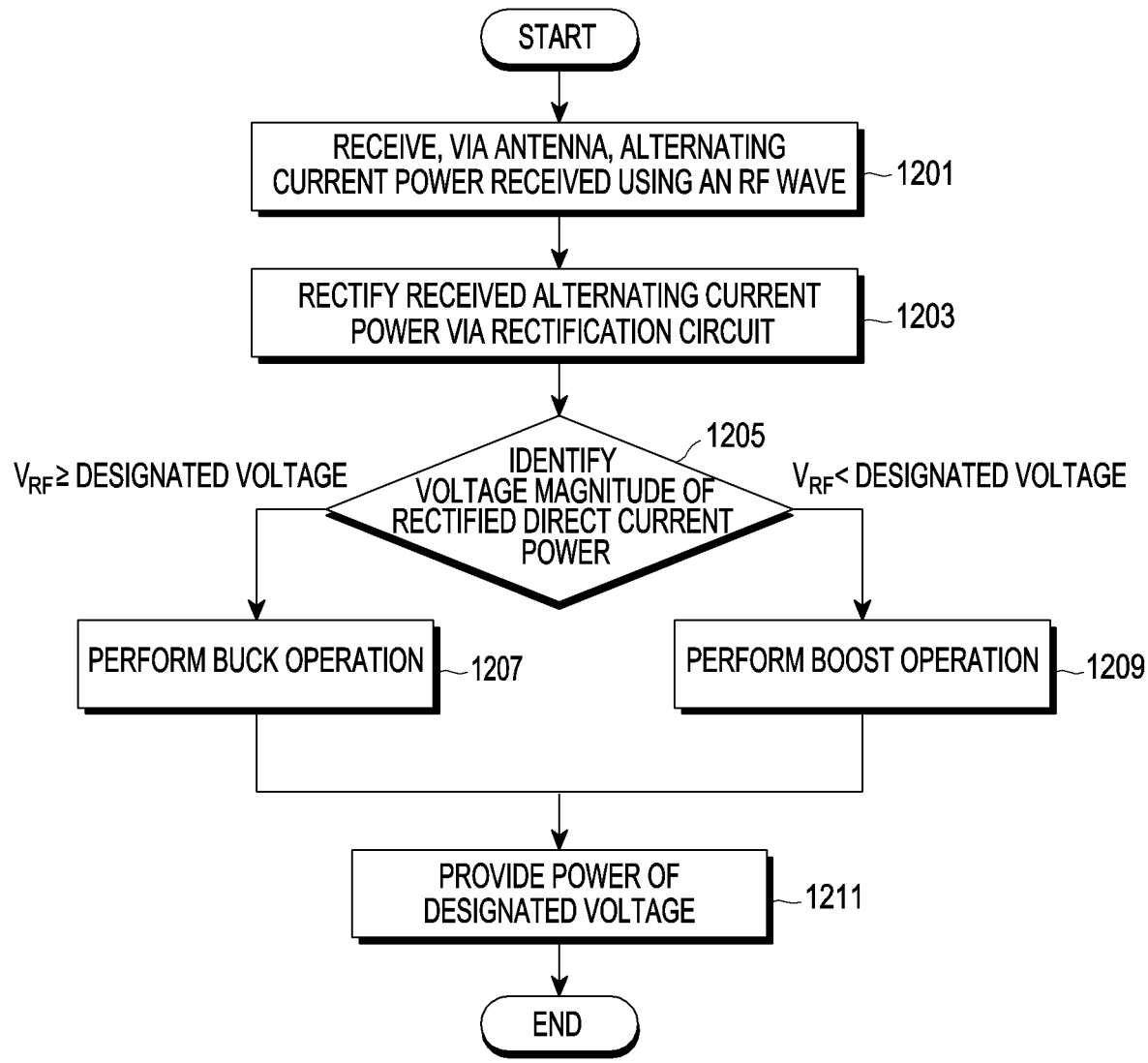
FIG. 12 is a flowchart for describing an operating method of an electronic device according to various embodiments of the present disclosure.

FIG. 12 is a flowchart for describing an operating method of an electronic device according to various embodiments of the present disclosure.

Referring to FIG. 12, it may be understood that operations 1201 to 1211 according to various embodiments are performed by an IC of an electronic device (e.g., a PMIC 156 of an electronic device 150 in FIG. 1 or FIG. 2, an IC 1010 of an electronic device 1000 in FIG. 10, or an IC 1110 of an electronic device 1100 in FIG. 11, hereinafter, the electronic device 1000 and the IC 1010 in FIG. 10 will be described as an example). In one embodiment, at least one of the operations 1201 to 1211 may be omitted, some operations may be simultaneously performed in parallel, an order of some operations may be changed, or other operations may be added.

In operation 1201, the IC 1010 of the electronic device 1000 according to various embodiments of the present disclosure may receive an alternating current power which is received using an RF wave formed around an antenna for power reception (e.g., an RF antenna) 1001.

In operation 1203, the IC 1010 may rectify the received alternating current power using a rectification circuit 1004. For example, the electronic device 1000 may obtain a direct current power by rectifying the received alternating current power using a rectification circuit according to an embodiment of any one of FIG. 5, 6, 7, 8, or 9.

In operation 1205, the IC 1010 may identify a magnitude of a voltage of the direct current power outputted from the rectification circuit 1004. According to various embodiments, the IC 1010 may identify whether the magnitude of the voltage (VRF) of the direct current power outputted from the rectification circuit 1004 is larger than or equal to, or smaller than a designated voltage (e.g., 5V) via a control circuit 1006.

In operation 1207, if the magnitude of the voltage (VRF) of the direct current power outputted from the rectification circuit 1004 is larger than or equal to the designated voltage (e.g., 5V), the IC 1010 may perform a buck operation of decreasing the voltage (VRF) of the outputted direct current power to the designated voltage (e.g., 5V) using a buck-boost converter 1008.

In operation 1209, if the magnitude of the voltage (VRF) of the direct current power outputted from the rectification circuit 1004 is smaller than the designated voltage (e.g., 5V), the IC 1010 may perform a boost operation of increasing the voltage (VRF) of the outputted direct current power to the designated voltage (e.g., 5V) using the buck-boost converter 1008.

In operation 1211, the IC 1010 may provide a power of the designated voltage outputted by the buck-boost converter 1008. According to various embodiments, the IC 1010 may provide the power of the designated voltage to an energy storage device such as a battery, and/or the like via a charging unit 1020. According to an embodiment, the IC 1010 may provide a power of a voltage designated by the buck-boost converter 1008 to each module (e.g., a communication module) of the electronic device 1000 via a load.

Each of the above-described components of the wireless power transmission device or the electronic device may include one or more components, and may be named differently according to a kind of an electronic device. According to various embodiments, the electronic device may include at least one of above-described components, and one or more of the above-described components may be omitted, or one or more other components may be added in the electronic device. Further, some of the components in the electronic device according to various embodiments may be integrated into a single entity. In such a case, the integrated entity may still perform one or more functions of some of the components in the same manner as they are performed by some of the components.

As used herein, the term "module" may mean a unit including one of hardware, software, or firmware, or a combination of at least two of the hardware, software, or firmware. The term "module" may interchangeably be used with other terms, for example, unit, logic, logical block, component, or circuit. A "module" may be the smallest unit of an integrated part or a portion thereof. A "module" may be the smallest unit for performing one or more functions, or a portion thereof. A "module" may be implemented mechanically or electronically. For example, a "module" may include at least one of a known, or to-be-developed, application-specific integrated circuit (ASIC) chip, field-programmable gate arrays (FPGAs), or programmable logic devices that perform certain operations.

At least a part of apparatuses (e.g., modules or their functions) or methods (e.g., operations) according to various embodiments may be implemented as instructions stored in computer-readable storage media in the form of a programming module. When the instructions are executed by a processor, the processor may execute functions corresponding to the instructions. The computer-readable storage media may be, for example, a memory.

The instructions as described above may be stored in an external server, and may be downloaded and installed in an electronic device such as a wireless power transmitter. That is, the external server according to various embodiments of the present disclosure may store instructions which may be downloaded by the wireless power transmitter.

The computer-readable recording medium may include a hard disc, a floppy disc, magnetic media (e.g., a magnetic tape), optical media (e.g., a compact disc read-only memory (CD-ROM), a digital versatile disc (DVD), magneto-optical media (e.g., a floptical disc), a hardware device (e.g., a read only memory (ROM) or a random access memory (RAM)), a flash memory, and/or the like. Program instructions may include a high-level language code which may be executed by an interpreter, and/or the like as well as a machine language code which is produced by a compiler. The above-described hardware device may be configured to operate as one or more software modules in order to perform operations according to various embodiments, and vice versa.

A module or a program module according to various embodiments may include at least one of the above-described components, may omit a portion thereof, or may include additional components. Operations which are performed by a module, a program module or other components according to various embodiments may be processed in a serial, parallel, repetitive or heuristic manner. Also, some operations may be performed in a different order or omitted, or additional operations may be added.

In addition, embodiments disclosed in this document are presented for description and understanding of the disclosed technical content, and do not limit the scope of the present disclosure. Therefore, the scope of the present disclosure should be construed as including all changes or various other embodiments based on the technical sprit of the present disclosure.

What is claimed is:

1. An electronic device, comprising:
a power reception circuit configured to wirelessly receive an alternating current power; and
a rectification circuit configured to rectify the alternating current power received via the reception circuit,
wherein the rectification circuit includes a forward rectification circuit, a reverse rectification circuit, and a loss compensation circuit,
wherein a first terminal of the forward rectification circuit is connected to the reception circuit and the reverse rectification circuit, a second terminal of the forward rectification circuit is connected to an output terminal, and the forward rectification circuit includes first transistors configured to rectify the alternating current power during a first period,
wherein a first terminal of the reverse rectification circuit is connected to the reception circuit and the forward rectification circuit, a second terminal of the reverse rectification circuit is connected to a ground, and the reverse rectification circuit includes second transistors configured to prevent the alternating current power from being transferred to the forward rectification circuit,
wherein the first transistors include first MOSFETs connected in series,
wherein the second transistors include second MOSFETs connected in series,
wherein the loss compensation circuit is configured to generate compensation voltages for compensating for a loss power of each of the first MOSFETs, and to provide each of the first MOSFETs with the compensation voltages, and
wherein the loss compensation circuit includes a first loss compensation circuit configured to generate a first compensation voltage using a gate voltage of a first MOSFET among the second MOSFETs, and to provide the first compensation voltage to a second MOSFET which corresponds to the first MOSFET among the first MOSFETs.

2. The electronic device of claim 1, wherein the first MOSFETs include first N-MOSFETs, and
wherein the second MOSFETs include second N-MOSFETs.

3. The electronic device of claim 2, further comprising:
P-MOSFETs connected in parallel to each of the first N-MOSFETs; and
P-MOSFETs connected in parallel to each of the second N-MOSFETs.

4. The electronic device of claim 1,
wherein the first MOSFETs include first P-MOSFETs,
wherein the first MOSFETs include second P-MOSFETs, and wherein the rectification circuit further includes N-MOSFETs connected in parallel to each of the first P-MOSFETs, and P-MOSFETs connected in parallel to each of the second N-MOSFETs.

5. The electronic device of claim 1, wherein the first MOSFETs include a first N-MOSFET, a second N-MOSFET, a third N-MOSFET, and a fourth N-MOSFET, and wherein the second MOSFETs include a fifth N-MOSFET, a sixth N-MOSFET, a seventh N-MOSFET, and an eighth N-MOSFET.

6. The electronic device of claim 5, wherein a first gate and a first drain of the first N-MOSFET are connected to the reception circuit, a first source of the first N-MOSFET is connected to a second gate and a second drain of the second N-MOSFET, a second source of the second N-MOSFET is connected to a third gate and a third drain of the third N-MOSFET, a third source of the third N-MOSFET is connected to a fourth gate and a fourth drain of the fourth N-MOSFET, and a fourth source of the fourth N-MOSFET is connected to the output terminal, and wherein a fifth source of the fifth N-MOSFET is connected to the reception circuit, a sixth source of the sixth N-MOSFET is connected to a fifth gate and a fifth drain of the fifth N-MOSFET, a seventh source of the seventh MOSFET is connected to a sixth gate and a sixth drain of the sixth N-MOSFET, an eighth source of the eighth N-MOSFET is connected to a seventh gate and a seventh drain of the seventh N-MOSFET, and a seventh gate and a seventh drain of the eighth N-MOSFET are connected to the ground.

7. The electronic device of claim 1, further comprising:

a sensing circuit configured to sense a magnitude of a voltage of a direct current power rectified from the rectification circuit;

a buck-boost converter configured to perform a buck operation of decreasing a voltage of the rectified direct current power to a designated voltage based on the sensed magnitude of the voltage of the direct current power, or to perform a boost operation of increasing the voltage of the rectified direct current power to the designated voltage; and a charging unit configured to receive a power of the designated voltage and to perform a charging operation.

* * * * *